United States Patent [19]

Deering

[11] Patent Number: 4,945,500
[45] Date of Patent: Jul. 31, 1990

[54] TRIANGLE PROCESSOR FOR 3-D GRAPHICS DISPLAY SYSTEM

[75] Inventor: Michael F. Deering, Mountain View, Calif.

[73] Assignee: Schlumberger Technologies, Inc., San Jose, Calif.

[21] Appl. No.: 440,459

[22] Filed: Nov. 20, 1989

Related U.S. Application Data

[63] Continuation of Ser. No. 117,110, Nov. 4, 1987, abandoned.

[51] Int. Cl.$^5$ ............................................. G09G 1/06
[52] U.S. Cl. ..................................... 364/522; 340/723
[58] Field of Search ....................... 364/521, 522, 511; 340/721, 723, 728, 729, 731, 732, 747, 750; 358/104

[56] References Cited

U.S. PATENT DOCUMENTS 3,372,557  5/1973  Evans et al.
3,684,876  8/1972  Sutherland
3,732,557  5/1973  Evans et al.
3,763,365  10/1973  Seitz
3,816,726  6/1974  Sutherland et al.

(List continued on next page.)

FOREIGN PATENT DOCUMENTS

0137233A2  8/1984  European Pat. Off.
0168981A2  6/1985  European Pat. Off.
0167165A2  7/1985  European Pat. Off.
WO84/01153  7/1984  PCT Int'l Appl.
WO84/01705  10/1984  PCT Int'l Appl.

OTHER PUBLICATIONS

"High Speed Image Rasterization Using Scan Line Access Memories", Demetrescu, 1985 Chapel Hill Conference on Very Large Scale Integration 35 (H. Fuchs ed, 1985).

"Super Buffer: A Systolic VSLI Graphics Engine for Real Time Raster Image Generation", Gharachorloo & Pottle, 1985 Chapel Hill Conference on Very Large Scale Integration 35 (H. Fuchs ed, 1985).

"Pixel-Planes: Building a VLSI-Based Graphics System", Foulton et al., 1985, Chapel Hill Conference on Very Large Scale Integration 35 (H. Fuchs ed, 1985).

"Reentrant Polygon Clipping", Sutherland & Hodgman, Communications of the ACM, Jan. 1974, vol. 17.

"An Anaylsis and Algorithm for Polygon Clipping", Liang & Barsky, Research Contributions, Robert Haralick, Editor, 1983 ACM.

"A VLSI Approach to Computer Image Generation", Cohen & Demetrescu, presented at the First Interservice/Industry Training Equipment Conference, Orlando, Fla., Nov. 28, 1979.

Primary Examiner—William M. Shoop, Jr.
Assistant Examiner—A. Jonathan Wysocki
Attorney, Agent, or Firm—David H. Carroll; Robert C. Colwell; Paul C. Haughey

[57] ABSTRACT

A processor which stores a representation of a polygon forming a portion of a three-dimensional object and compares the polygon to pixels from a scan line as they are passed by. The processor stores a representation of a polygon and compares each pixel passed by the processor to the polygon to determine whether the pixel is within the polygon. If the pixel is within the polygon, its Z position (depth) is compared to the Z position of a corresponding position in the polygon. If the Z position of the polygon position is in front of the Z position of the pixel so that the polygon would obscure the previous pixel description, the Z position and an associates material value (e.g., color) of the polygon is substituted for the Z position of the pixel. The three-dimensional object is preferably represented with triangles and each polygon processor is preferably a triangle processor, with a series of triangle processors arranged in a pipeline. Two pipelines may be provided in parallel. Several triangle processors can be placed on a single semiconductor chip with input and output buffers for performing multiplexing, delaying and skewing. An X counter on the chip rederives the pixel X position, eliminating the need for this input.

25 Claims, 13 Drawing Sheets

U.S. PATENT DOCUMENTS

| | | |
|---|---|---|
| 3,889,107 | 6/1975 | Sutherland . |
| 4,283,765 | 8/1981 | Rieger . |
| 4,291,380 | 9/1981 | Rohner . |
| 4,343,037 | 8/1982 | Bolton . |
| 4,371,872 | 2/1983 | Rossman . |
| 4,380,046 | 4/1983 | Fung . |
| 4,412,296 | 10/1983 | Taylor . |
| 4,458,330 | 7/1984 | Imsand et al. . |
| 4,492,956 | 1/1985 | Collmeyer et al. ............. 340/731 X |
| 4,550,315 | 10/1985 | Bass et al. ....................... 340/747 X |
| 4,570,181 | 2/1986 | Yamamura . |
| 4,570,233 | 2/1986 | Yan et al. . |
| 4,586,038 | 4/1986 | Sims et al. . |
| 4,646,075 | 2/1987 | Andrews et al. . |
| 4,658,247 | 4/1987 | Gharachorloo ..................... 340/747 |
| 4,697,178 | 9/1987 | Heckel ............................ 340/723 X |
| 4,709,231 | 11/1987 | Sakaibara et al. . |
| 4,730,261 | 3/1988 | Smith . |
| 4,736,200 | 4/1988 | Ounuma . |
| 4,737,921 | 4/1988 | Goldwasser et al. ........... 340/723 X |

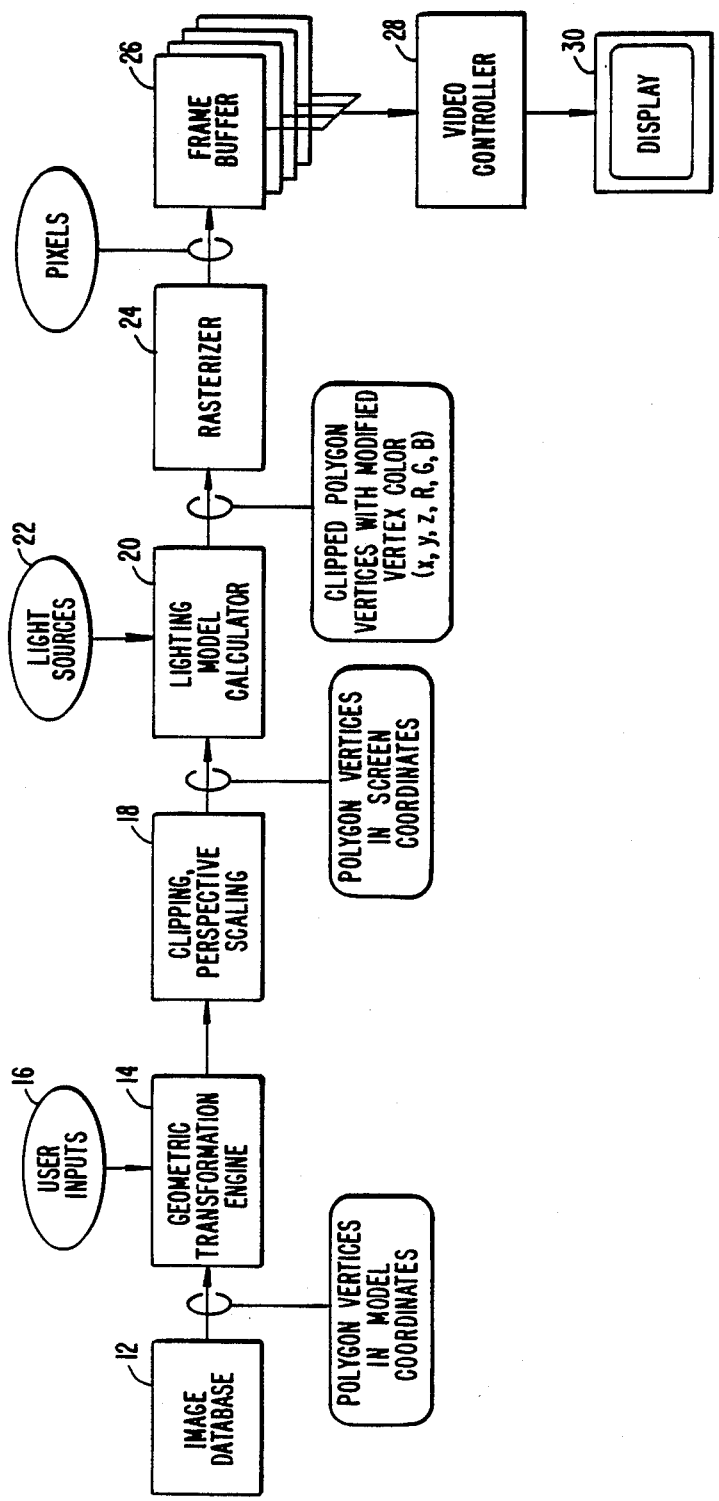
FIG._1. PRIOR ART

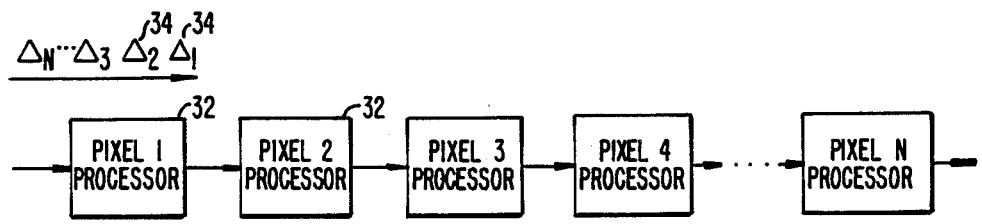
FIG._2. PRIOR ART
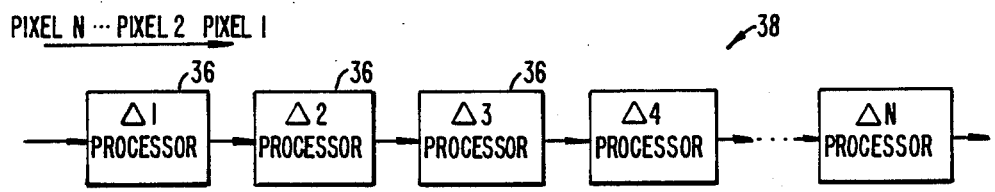
FIG._3.
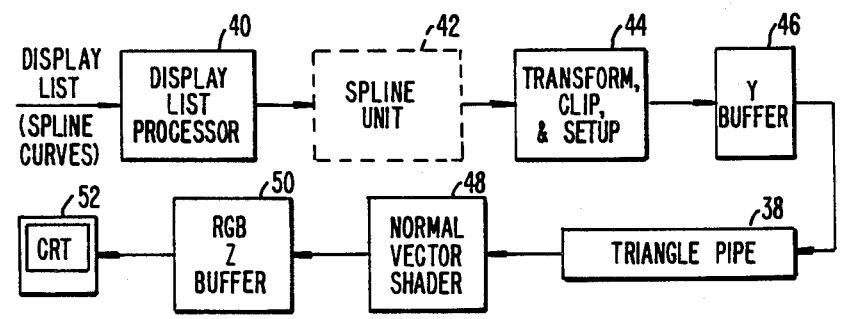
FIG._4.

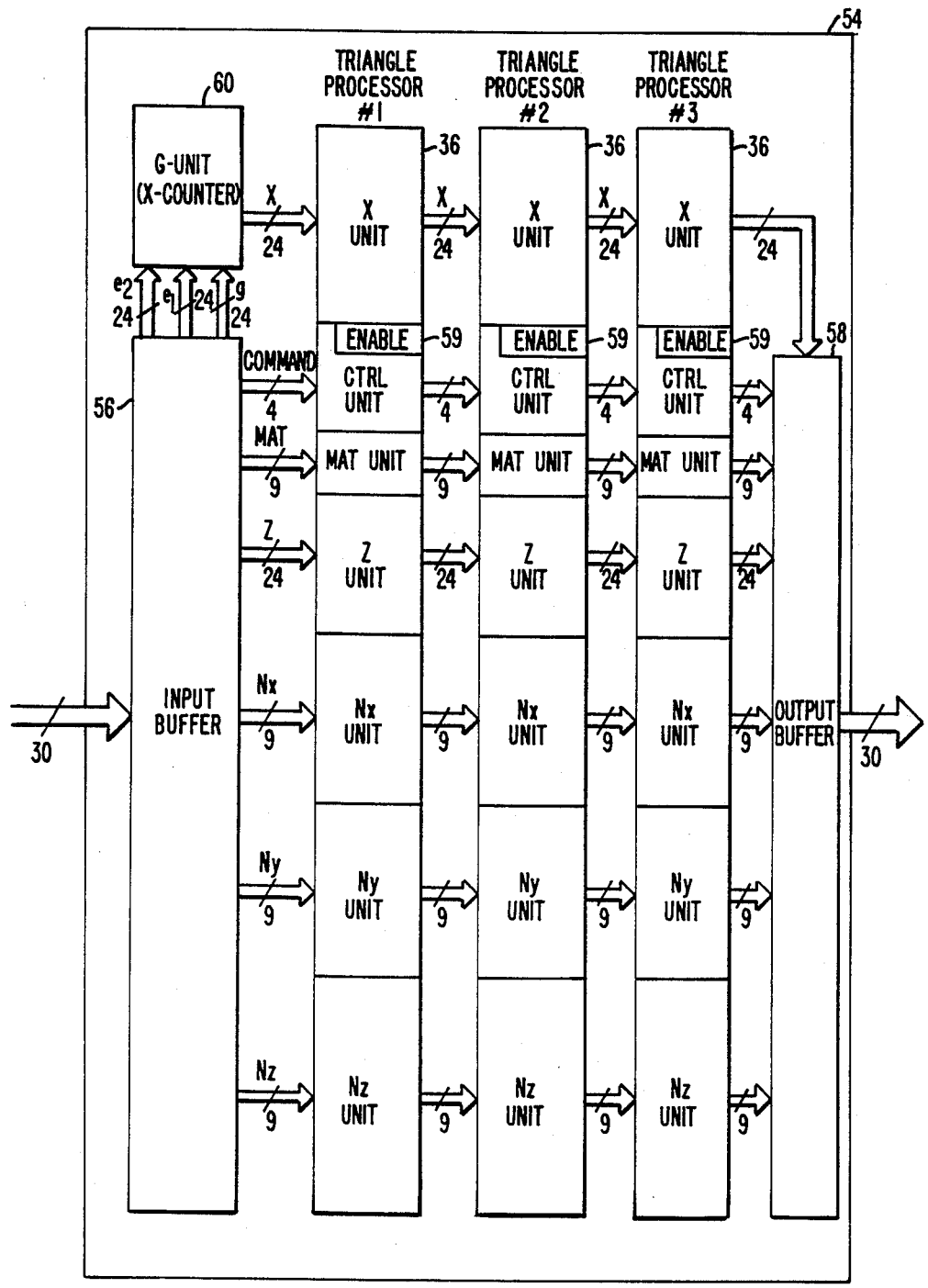
FIG._5.

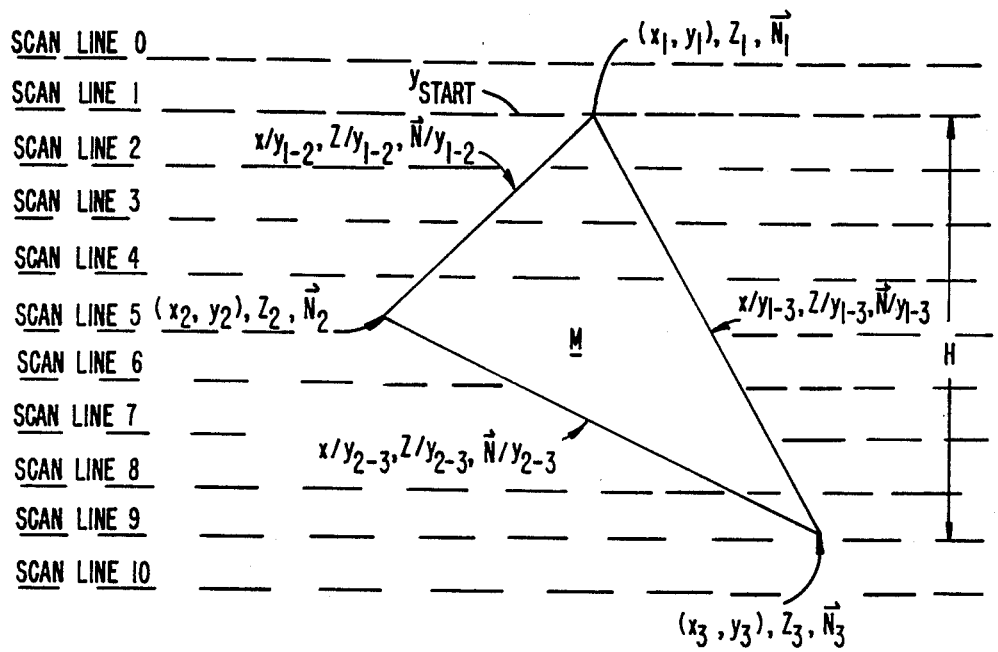
FIG._6.

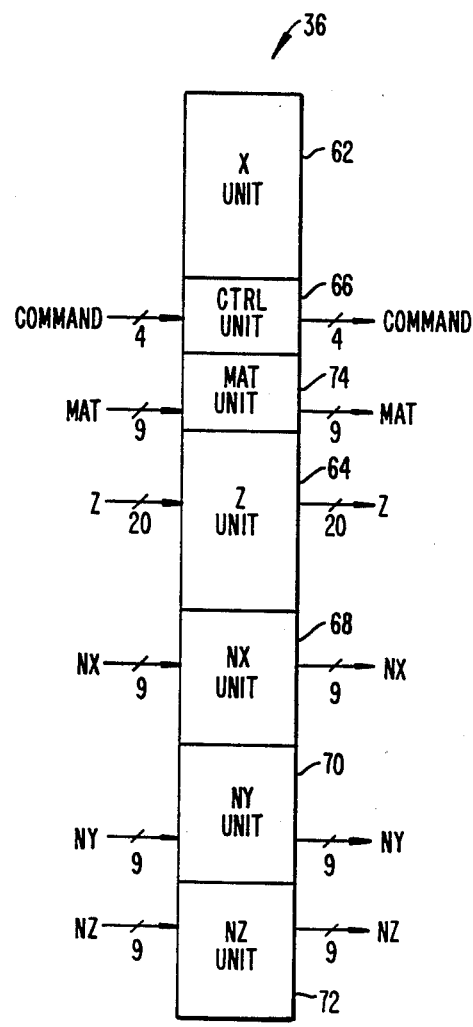
TRIANGLE PROCESSOR
FIG._7.

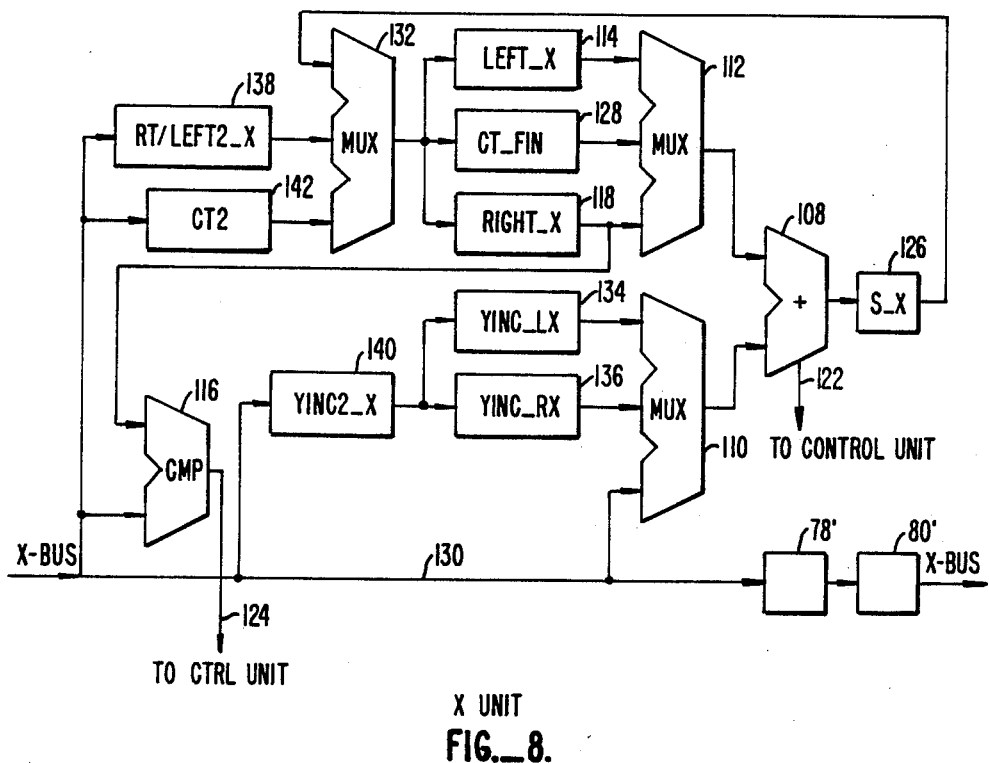
X UNIT
FIG.—8.
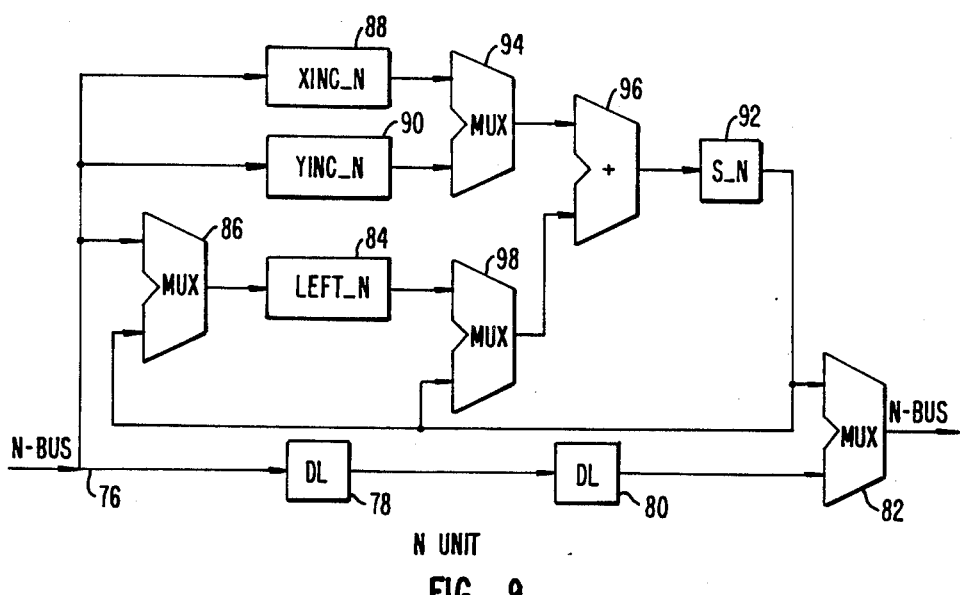
N UNIT
FIG.—9.

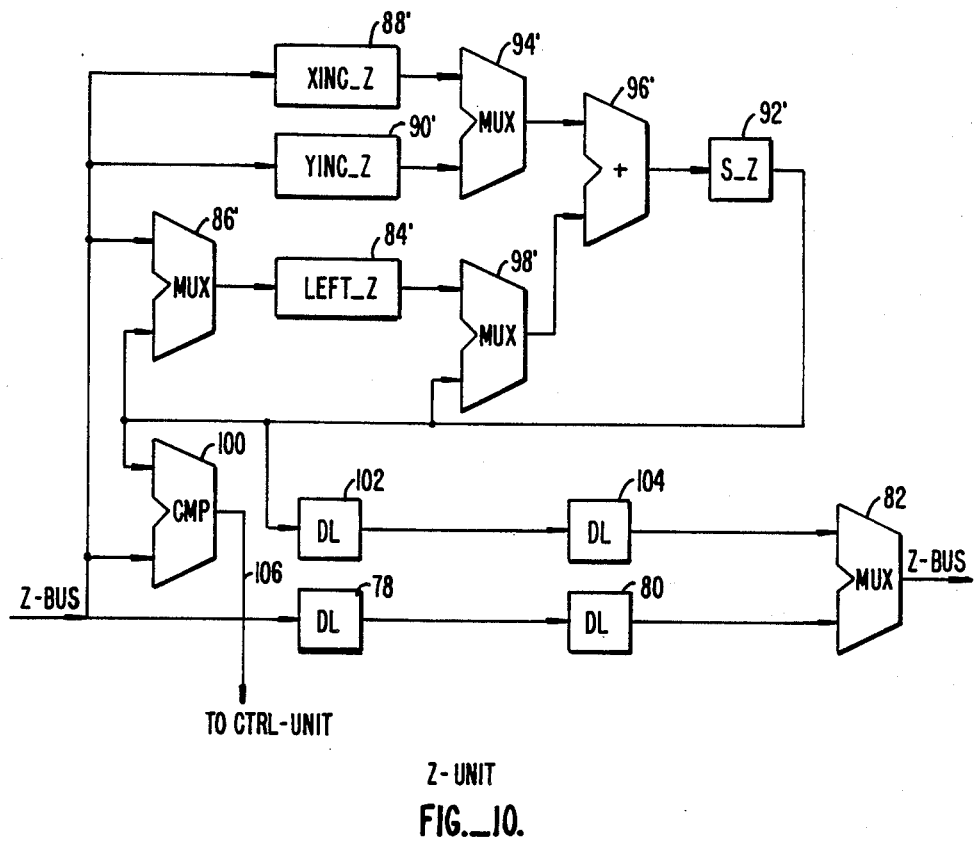
Z-UNIT
FIG._10.
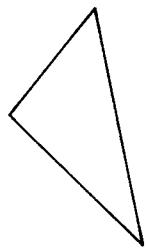
FIG._11A.
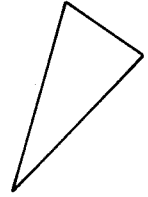
FIG._11B.

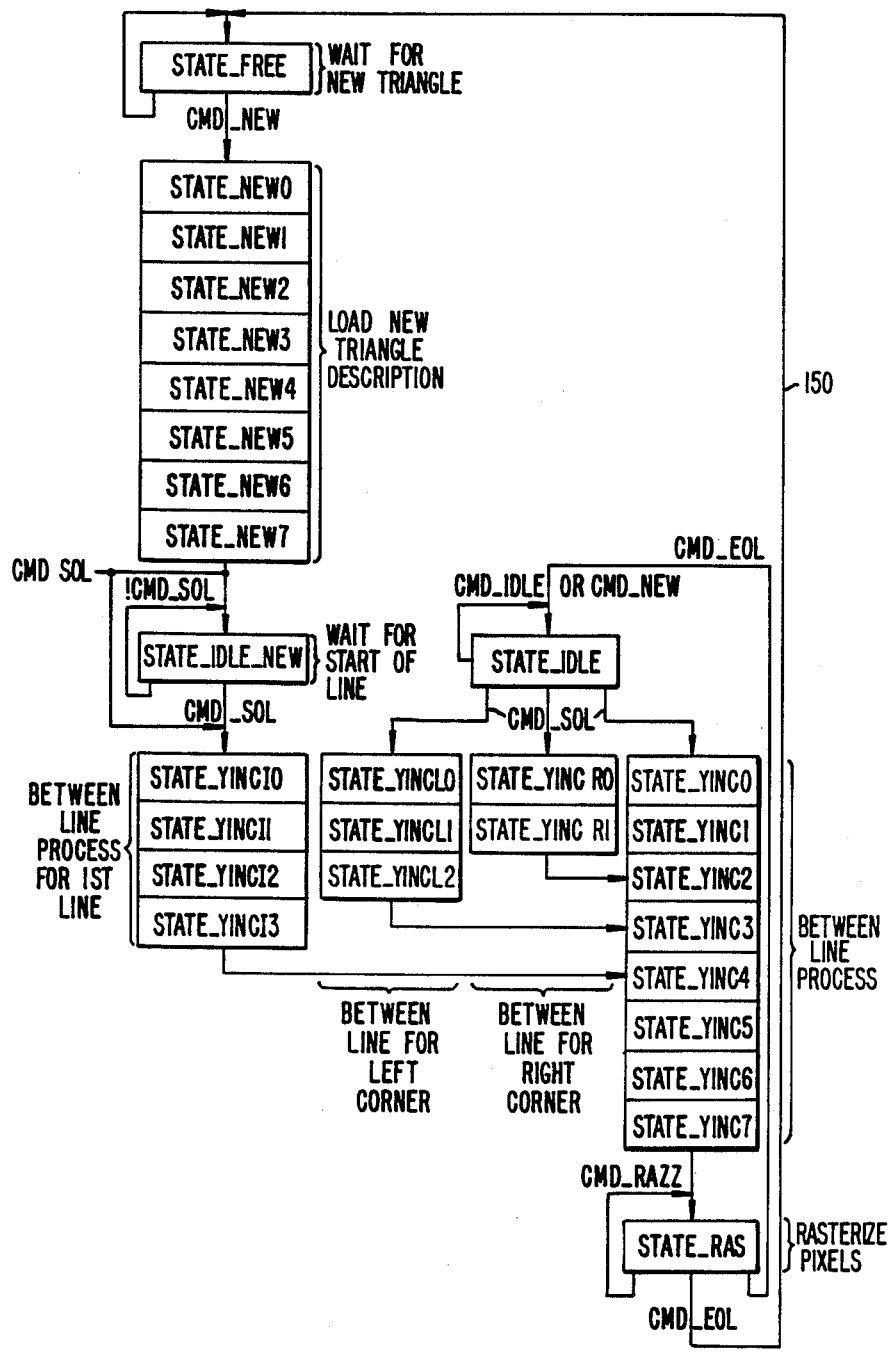
FIG._12.

| | 0 | 1 | 2 | 3 | 4 | 5 | 6 | 7 |
|---|---|---|---|---|---|---|---|---|
| 0 | NEW | NEW | NEW | NEW | NEW | NEW | NEW | NEW |
| 4 | ENABLE | CT_FIN 7:0 (X UNIT) | CT_FIN 15:8 (X UNIT) | | MAT (MAT UNIT) | | CONFIG (CTRL UNIT) | |
| 12 | (X UNIT) LEFT_X | (X UNIT) RIGHT_X | (X UNIT) RT/LEFT2_X | LEFT_NX ($N_x$ UNIT) | YINC_LX (X UNIT) | XINC_NX ($N_x$ UNIT) | YINC2_X (X UNIT) | YINC_NX ($N_x$ UNIT) |
| | | | | LEFT_NY ($N_y$ UNIT) | | XINC_NY ($N_y$ UNIT) | | YINC_NY ($N_y$ UNIT) |
| 36 | LEFT_Z (Z UNIT) | XINC_Z (Z UNIT) | YINC_Z (Z UNIT) | LEFT_NZ ($N_z$ UNIT) | YINC_RX (X UNIT) | XINC_NZ ($N_z$ UNIT) | CT2 (X UNIT) | YINC_NZ ($N_z$ UNIT) |

FIG._13.

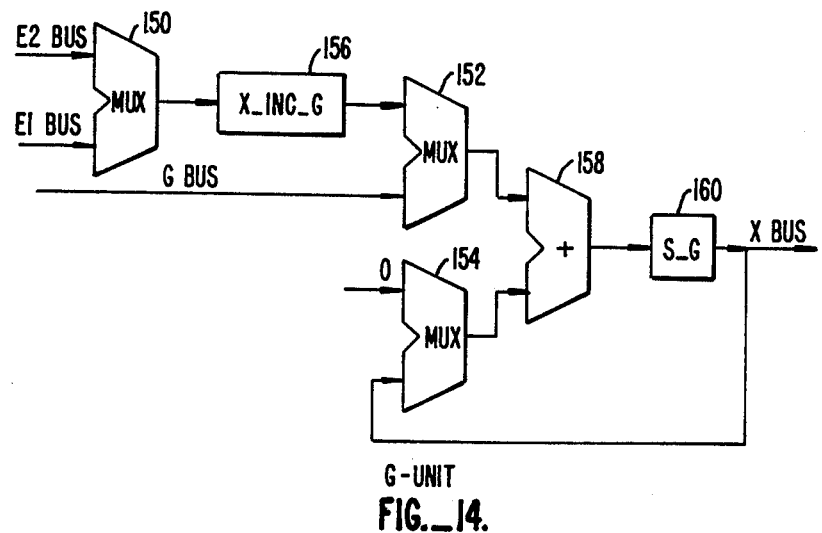
FIG._14.
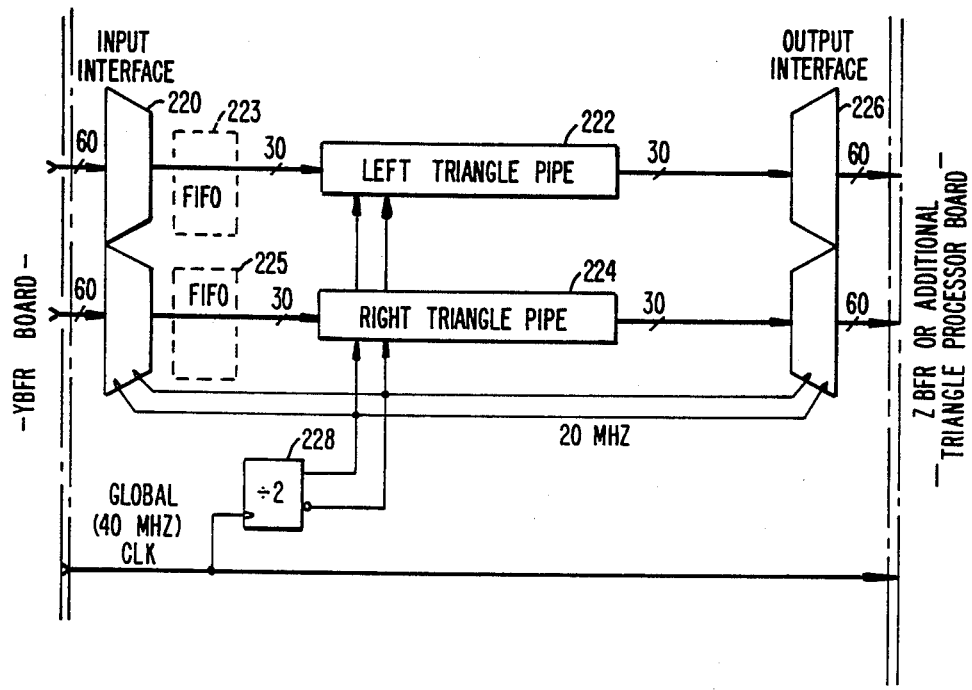
FIG._15.

TRIANGLE PROCESSOR FOR 3-D GRAPHICS DISPLAY SYSTEM

This is a continuation of application Ser. No. 117,110, filed Nov. 4, 1987, now abandoned.

Appendix I is a high level description of the microcode indexed by the state machine of FIG. 12.

Appendix II is an explicit listing and naming of control signals for the function units of FIGS. 8, 9 and 10.

BACKGROUND

The present invention relates to processing systems for three-dimensional computer graphics displays.

Three-dimensional computer graphics displays are used to display images to a user as if he were observing a real world environment. These systems store in a data base a representation in three-dimensional coordinates of three-dimensional objects, as well as their color and other properties. Additional "environment" information including the number, color, location, and other properties of illumination sources, atmospheric properties, and many other details may also be specified. The display is produced after being provided with the desired viewing angle for the viewer. The system must calculate all the details of the image, including determining which objects obscure others from the viewer's point of view, and present them accordingly.

A typical graphics display system is shown in FIG. 1. An image data base 12 stores a description of the objects in the scene. The objects are described with a number of small polygons which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadralaterals, and the latter can always be decomposed into pairs of triangles.

A transformation engine 14 transforms the object coordinates in response to the angle of viewing selected by a user from user input 16. In addition, the user may specify the field of view, the size of the image to be produced, and the back end of the viewing volume so as to include or eliminate background as desired.

Once this viewing area has been selected, a clipping circuit 18 eliminates the polygons (i.e., triangles) which are outside the viewing area and "clips" the polygons which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model 20 is next applied taking into account the light sources 22. The polygons with their color values are then transmitted to a rasterizer 24.

For each polygon, rasterizer 24 determines which pixel positions are covered by the polygon and attempts to write the associated color values and depth (Z value) into frame buffer 26. Rasterizer 24 compares the depth values (Z) for the polygon being processed with the depth value of a pixel which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, video controller 28 displays the contents of frame buffer 26 on a display 30 a scan line at a time in raster order.

A number of systems have been designed to improve upon the basic system of FIG. 1. With recent improvements in floating point processing and polygon fill algorithms, the main bottleneck of the system is the amount of time required to rasterize each polygon, compare it to what is already stored in the frame buffer, and then write it into the frame buffer. The time required to repeat this process for each polygon is substantial.

A basic method is characterized by a single rasterization processor writing pixels one by one into a DRAM frame buffer array. The improved systems are characterized by employing a large number of processors in parallel in which the individual processors represent pixels in the frame buffer. These systems differ in how the processors are assigned to pixels.

The pixel-planes method employs brute force, and assigns a processor for every pixel in the display screen, as set forth in Foulton, et al., Pixel-Planes: Building a VLSI-Based Graphics System, 1985 Chapel Hill Conference on Very large Scale Integration 35 (H. Fuchs ed, 1985). The edges of two dimensional polygon descriptions are sent one by one to the pixel processors. The processors determine which side of each edge they are on, and consider themselves inside a particular polygon only if they are on the correct side of all its edges. Having determined membership for a given polygon, the pixel processors next load interpolated depth and color information inside their pixel value register, so long as the depth information is less than that of any previously stored pixel value. When all polygons have been processed, the information stored at each pixel is supplied to the display in raster scan order. This system has the advantage in speed over the system in FIG. 1 in that the drawing time for any polygon (with a fixed number of sides) is constant, regardless of the number of pixels effected by the polygon (the area of the polygon). The disadvantage is that an extremely large number of processors is needed. For instance, a 1K×1K display would require in excess of one million processors. This disadvantage is only somewhat mitigated by placing multiple pixel processors on a single chip.

The Scan Line Access Memory (SLAM) still requires custom storage registers for each pixel in the display, but only contains enough pixel processors for a single scan line. It is set forth in Demetrescu, High Speed Image Rasterization Using Scan Line Access Memories, 1985 Chapel Hill Conference on Very Large Scale Integration 35 (H. Fuchs ed, 1985). The idea here is to use external rasterization hardware to break up each polygon into horizontal runs of pixels. Only the start and stop addresses of these runs are entered into the SLAM chips, the internal one dimensional array of pixel processors determines which pixels are covered by this run. The results are written into an on-chip memory array of pixel values, indexed by the y location of this particular run. When all the polygons have been processed, internal double buffering allows the information stored at each pixel to be supplied to the display in raster scan order. This system has the advantage that large polygons can be rasterized in time mostly only dependent upon their height, not their area. The smaller number of pixel processors reduces the number of chips needed compared to pixel planes. However, the system does have several disadvantages. Considerable external circuitry must break up polygons into pixel runs, and sequence this data to the SLAM chips. The line by line overhead required per polygon reduces the overall speed of the system. Finally, the requirement for on-chip RAM resources for all pixel effected by the local pixel processors still means that an exorbitant number of chips are needed to make a functioning 1Kx1K system.

The super buffer also employs a single scan line of pixel processors, but does not require local memory for all the pixels effected by them to be on the same chip. It is set forth in Gharachorloo and Pottle, Super Buffer: A Systolic VLSI Graphics Engine for Real Time Raster Image Generation, 1985 Chapel Hill Conference on Very Large Scale Integration 35 (H. Fuchs ed, 1985). The previous two systems take input polygons one at a time, rasterizing each one completely before going on to the next. The super buffer requires all the polygons to be displayed to be presorted by the y scan line they first appear on. Each polygon is broken up into runs on a scan line basis, and the runs sent to the pipe of pixel processors. The trick is to send all the runs for all polygons for a given scan line before sending any runs for any further scan lines. This requires a buffer of partially rasterized polygons to be kept. This system has the advantage that the time to rasterize a given polygon is as in SLAM: dependent only on the height of the polygon, and not its area. It also has the advantage that the number of chips required by a system is considerably lower than in the other two systems. However, it has several disadvantages. It shares SLAM's requirement for an off-chip polygon run generator, and adds the requirement for juggling several active polygons at a time within this generator. A further requirement is an off-chip memory subsystem to store and sort by starting y scan line all the polygons to be displayed.

SUMMARY OF THE INVENTION

The present invention is a processor which stores a representation of a polygon forming a portion of a three-dimensional image and compares the polygon to pixels from a scan line as they are passed by. This is the opposite of prior art systems which have provided a processor for each pixel in a scan line and past the polygon descriptions passed the pixel processors. The processor stores a representation of a polygon and compares each pixel passed by the processor to the polygon to determine whether the pixel is within the polygon. If the pixel is within the polygon, its Z position (depth) is compared to the Z position of a corresponding position in the polygon. If the Z position of the polygon position is in front of the Z position of the pixel so that the polygon would obscure the previous pixel description, the Z position and an associated material value (e.g., color) of the polygon is substituted for the Z position of the pixel.

The three-dimensional image is preferably represented with triangles and each polygon processor is preferably a triangle processor, with a series of triangle processors arranged in a pipeline as shown in FIG. 3. For each scan line, some of triangle processors 36 are loaded with a description of a triangle which begins on that scan line. Pixels 1−N for that scan line are sent down the triangle pipe and each processor compares its triangle to that pixel. If the pixel is within the triangle, the depth and material (color) information for that triangle is attached to the pixel unless a previous addition by a preceding triangle processor is in front and thus would obscure the particular triangle in the final image. In that case, the pixel with its data is passed along unchanged. At the end of the pipeline, each pixel will have the data for the triangle which is in front and will be ready for application to a CRT monitor. The process is repeated for each scan line with the triangle processors remaining active for all scan lines covered by the triangle. When the last scan line touched by the triangle is passed, the triangle processor is ready to accept a new triangle description.

The use of triangle processors provides a speed improvement for three-dimensional display systems of one to two orders of magnitude beyond the present state of the art. The triangle processor pipeline is supported by a system which receives a display list describing a three-dimensional image, clips the triangles described according to a desired viewing angle, orders the triangles for presentation to the triangle pipe and processes the data output from the triangle pipe to provide shading as desired. Such a system is shown in copending application Serial No. 117111, filed Nov. 4, 1987, and incorporated herein by reference.

Prior to the rasterization of a particular scan line, the triangle pipe is sent descriptions of each triangle beginning on that scan line. These descriptions describe the vertices of the triangles and their slopes, along with depth and normal vectors for the vertices and slopes, and a material value (i.e., color or texture). Each available triangle processor will accept the first triangle description which it encounters. Once a triangle processor has a triangle description, it will simply pass successive triangle descriptions on down the pipe.

During rasterization, each triangle processor can determine when a pixel crosses one of its boundaries from the data stored in the processor. Thereafter, the triangle processor will use an interpolation of the Z position across the triangle. The triangle processor could also interpolate other data, such as surface color values, normal vectors and texture map coordinates, etc.

Each triangle processor has a state machine shown in FIG. 12 which loads the triangle descriptive data and then controls the operation of the processor during rasterization and line returns in between rasterization. An X-unit shown in FIG. 8 determines whether a pixel is within the triangle boundaries. Once a pixel is within the triangle boundaries, the X-unit notifies the state machine which controls a Z-unit shown in FIG. 10 and an N-unit shown in FIG. 9. The N and Z units interpolate the values of N and Z across the triangle. When the Z unit is notified that a pixel is within the triangle, each value of Z is compared with the value of Z already associated with the pixel, and if the triangle's value is in front of the pre-existing value, it is substituted for the existing value along with the normal vector value and the material value of the triangle.

Because each pixel is only sent to the pipeline once, a large speed increase over prior art systems is achieved. In one embodiment, two triangle pipelines are used, one for each half of a display screen. The pipelines are arranged in parallel, one pipeline being loaded with triangle data while the other pipeline is processing pixels.

In one embodiment, a number of triangle processors are mounted in series on a single semiconductor chip, with a large number of chips being arranged in series to form the pipeline. Each chip has an input buffer and an output buffer for demultiplexing and multiplexing input and output signals, respectively, to reduce the number of pins required. The input data is sent into the chip in two segments, A and B, with two clock signals which are preferably the rising and falling edges of a single clock cycle. Thus, only half the number of pins as there are inputs (and outputs) are required. The semiconductor chip also includes an X-counter which produces on the chip the pixel X position, thus eliminating the need to input this data onto the chip for each pixel. Because the pixels are processed in regular scan line order, these counters can simply be initiated at the beginning of each scan line and need not be externally updated each cycle. The initial register value is required by the X-counter and the X units of each processor are input over the same input pins as are used for pixel data during rasterization. Preferably, the input data for the entire chip is entered in 8 cycles of two segments each. The unique configuration of the triangle processors is for pixels to be run past the triangle descriptions, and enables this optimization of pins since it allows the use of an internal X counter.

The present invention has a number of advantages over the prior art. The triangle description only needs to be entered once, as opposed to prior art systems where the triangle description must be re-entered every scan line.

Additionally, the rendering time is bounded by the entering time for new triangle descriptions, not by the number of scan lines or screen area.

The system of the present invention is not limited to a particular screen width (or height). The number of processors need not equal the number of pixels in a scan line as in some prior art systems.

For a fuller understanding of the nature and advantages of the invention, reference should be made to the ensuing detailed description taken in conjunction with the accompanying drawings.

BRIEF OF THE DRAWINGS

FIG. 1 is a block diagram of a prior art three-dimensional display system;

FIG. 2 is a block diagram of a pixel processor system of the prior art;

FIG. 3 is a block diagram of the triangle processor pipeline according to the present invention;

FIG. 4 is a block diagram of a three-dimensional display system incorporating the triangle pipeline of FIG. 3;

FIG. 5 is a block diagram showing the placement of several triangle processors on a single chip;

FIG. 6 is a diagram of a triangle showing the information used to describe the triangle and its intersection with the scan lines;

FIG. 7 is a block diagram of a triangle processor according to the present invention;

FIG. 8 is a block diagram of the X-unit of FIG. 7;

FIG. 9 is a block diagram of one of the N-units of FIG. 7;

FIG. 10 is a block diagram of the Z-unit of FIG. 7;

FIGS. 11A and 11B show triangle orientations in which the left slope and right slope change in the middle of the triangle, respectively;

FIG. 12 is a block diagram of the control unit state machine of FIG. 7;

FIG. 13 is a map of the triangle description data for loading into the triangle processor registers;

FIG. 14 is a block diagram of the 6-unit (X-counter) of FIG. 5; and

FIG. 15 is a diagram showing two triangle pipes in parallel.

DETAILED DESCRIPTION OF THE PREFERRED EMBODIMENT

FIG. 3 shows a pipeline 38 of triangle processors according to the present invention. FIG. 4 shows pipeline 38 incorporated into a three-dimensional display system. The system has a display list processor 40 which receives a display list of polygons or spline curves describing a three-dimensional object. If these are in spline form, they are passed through an optional spline unit 42 for conversion into polygon form. A transform, clip and set-up unit 44 selects the triangles within a desired viewing area and from a desired viewing angle, rejects triangles outside of this area and clips triangles crossing the boundaries of this area. Unit 44 also sets up the triangle descriptions into a format required by the triangle processors. The triangles are supplied to a Y-buffer 46 which orders the triangles in scan line (Y) order. Triangle descriptions are then stored in triangle processors in triangle pipe 38 for the number of scan lines intersected by the triangle. Each line of the scan line is then sent to triangle pipe 38 and the pixels output from triangle pipe 38 have the depth and material information of the triangle which was in front for that pixel. The pixels are provided to a normal vector shader 40. Normal vector shader 40 applies the lighting model in the context of the current illumination environment to the input Z and material tags (e.g., color and normal vector) to produce an output RGB value for the pixel. These are provided to an optional RGB Z-buffer 42 and from there to a CRT 44. A more detailed description of this system is provided in the copending application referenced above.

Several Processors on a Chip

FIG. 5 shows the incorporation of several triangle processors 36 onto a single chip 54. The triangle processors are coupled in series and chip 54 is provided with an input buffer 56 and an output buffer 58. An X-counter unit 60 is used to rederive the time-skewed scan line X-position. This is derived on-chip to reduce the pin count.

The input buffer runs I/O pads at double the clock rate of the internal logic. Thus, to the internal logic, the 30 input and 30 output pins appear to be 60 input and 60 output pins. The 60 bits of "virtual" pins are shown as command (4), mat (9), Z (20), Nx (9), Ny (9) and Nz (9). Because the input buffer must provide data to a pipeline which requires different parts of the data at different times, the input buffer must delay (skew) portions of the data which must then be deskewed by the output buffer. As part of the input buffer's delay, all the inputs except the 4-bit command are delayed for four clock cycles to allow the triangle processors time to decode the command before receiving the data.

Theory of Operation

The overall goal can be stated as follows: given a collection of projected triangles, each with Z coordinates and associated surface normal vectors, generate a 2-D image such that each pixel value contains the normal vector of the single triangle which is closest (smallest Z) within the field of this pixel, and furthermore the normal vector must be taken from the portion of the winning triangle that projects directly into the center of the pixel.

Mathematically we can describe a triangle k as a conjunction of half-planes described by nine constants $e_{11}^k$–$e_{33}^k$ (the superscript k denotes the particular triangle and T indicates the triangle is present):

$$T(x,y,k) = \text{iff} \quad e_{11}^k \cdot x + e_{12}^k \cdot y + e_{13}^k > 0 \text{ AND}$$
$$e_{21}^k \cdot x + e_{22}^k \cdot y + e_{23}^k > 0 \text{ AND}$$
$$e_{31}^k \cdot x + e_{32}^k \cdot y + e_{33}^k > 0 \text{ AND}$$

The values of the surface normal vector components, Z and material index M for a particular triangle can be described with thirteen more constants:

$$nx(x,y,k) = nx_1^k \cdot x + nx_2^k \cdot y + nx_3^k$$
$$ny(x,y,k) = ny_1^k \cdot x + ny_2^k \cdot y + ny_3^k$$
$$nz(x,y,k) = nz_1^k \cdot x + nz_2^k \cdot y + nz_3^k$$
$$z(x,y,k) = z_1^k \cdot x + z_2^k \cdot y + z_3^k$$
$$m(x,y,k) = m^k$$

Note that these values are described for all x-y positions, but are only valid when T(x,y,k) is true. The image formation function can now be described as the values of nx(x,y,k), ny(x,y,k), nz(x,y,k), z(x,y,k) and m(x,y,k) for all x-y with the k for each x-y chosen to minimize z(x,y,k) for those k for which T(x,y,k) is true. To obtain a digital image, the function must be sampled at particular x-y values defined upon a regular grid.

The algorithm employed in the triangle processors is to assign each triangle k to an individual triangle processor i for those y scan lines of an x-y raster scan for which T(x,y,k) is defined. On each of these scan lines the triangle processor will compute the values of T(x,y,k), nx(x,y,k), ny(x,y,k), nz(x,y,k), z(x,y,k) and m(x,y,k) for all values of x. Each triangle processor also performs a sorting function: for each value of x-y it will take in the image output value from its left neighbor, and pass to its right neighbor either this value or its internally computed value as determined by the value with the least defined z value. The constants defined above closely correspond to the registers within each triangle processor. The additional constant value m(x,y,k) tags along with the winning image value, it represents the material index (color, texture, etc.) for the surface. Also, there is a translucency function defined for each triangle that causes T(x,y,k) to be forced to become false at regular intervals.

Conceptually, the description of each triangle provided to a triangle processor is shown in FIG. 6 and consists of:
1. The (x,y) location of the three endpoints of the triangle.
2. The values of (Z,nx,ny,nz) at each of those points.
3. The x/y slope of the three edge lines of the triangle.
4. The Z/y, nx/y, ny/y, nz/y slopes along the three edge lines of the triangle.
5. The starting line y coordinate (y start) of the uppermost endpoint of the triangle.
6. The overall height (H) of the triangle expressed as number of scan lines.
7. The material index (M) for the triangle.

This information is actually presented in more optimized form to the triangle processor.

The style of the triangle processor algorithm is raster order scan line computation of normal vectors and Z depths on a pixel by pixel bases. FIG. 6 displays our overall environment. Note that the scan lines increase down the page, as in a CRT.

The first job of the triangle processor is to properly model where the boundaries of the triangle are, scan line by scan line. This is done with two variables: left__x and right__x. These represent the coordinates of the left and right edge intersections of the triangle on a particular scan line.

The triangle description gives the intersections of the triangle with the uppermost scan line crossing it. To find the left and right intersections with the next integral scan line, the x/y slope of the left and right edges of the triangle are added to the left__x and right__x values. These slopes are contained in the values yinc__lx and yinc__rx stored in registers in the x-unit of FIG. 8 discussed later.

This process can continue until we encounter either the end of the triangle, or, as in the triangle in FIG. 6, a corner in one of the edges. If the end of the triangle is met, we are done with the rasterization, and nothing further needs to be done to the edge values. On the other hand, if a corner has been encountered, at this point we must load in a new value for left__x and yinc__x lx or right__x and yinc__rx, depending upon which side of the triangle the corner was encountered (see FIGS. 11A and 11B).

It is easy to understand why the yinc value must be updated, as the slope of the line has clearly changed. But it is less clear at first glance why we must also reload the actual bounding x value as well. The reason is that unless the corner occurred precisely on a scan line, our incrementally computed x location will undershoot or overshoot where we must be starting from to track the new edge.

But how do we know when a corner or the end of the triangle is hit? There are two counters, ct__fin and ct2 shown in FIG. 8. ct__fin initially contains a count of the number of scan lines before a corner in the triangle is encountered minus one. If the triangle type as encoded in a configuration register (in the control unit of FIG. 7) is not new__left or new__right, then the triangle contains no active corner, and ct__fin corresponds to the total number of active scan lines minus one. It is decremented by one each scan line until becoming negative, at which point new interpolation values are loaded into the appropriate registers. A separate bit in the configuration register indicates whether the processor is awaiting a new__left edge or a new__right edge. ct2 is initialized to the number of scan lines for which the triangle will be active beyond the corner minus one if it exists. Its value will be loaded into the ct__fin register if and when a corner of a triangle is encountered. (If no corner exists, ct2 should be initialized to −1 to help the y-buffer function.)

So far it has been described how the triangle processor can accurately model the bounds of its triangle on a scan line by scan line basis (e.g., compute T(x,y,k)). Once the pixel is being rasterized (passed down the pipe) is within the triangle, values must be interpolated. The Z depth and the value of the normal vector (nx,ny,nz) of the portion of the triangle within each pixel is determined on a pixel by pixel basis.

These quantities of interest are computed in two steps. First, just as with the x edge locations, we are given the initial values of the desired quantities (left_Z, left_nx, left_ny, left_nz) at the left intersection of the triangle with the uppermost scan line. Given also the parameters yinc_Z, yinc_nx, yinc_ny, and yinc_nz, we can incrementally compute the starting values of the quantities at the left hand edge of each scan line in order in the same manner that the left side x edge location was computed. Note that unlike the x computation, because of our order of raster scanning, we only need information about the left edge. Thus all the "yinc" parameters above refer to the slopes of the left hand edges. Second, on each scan line, starting with the current (left_Z, left_nx, left_ny, left_nz) values, and loading them into the (span_Z, span_nx, span_ny, span_nz) registers (see FIGS. 9, 10), we can incrementally compute the desired local values for each pixel by adding for each pixel in the scan line the x increments: (xinc_Z, xinc_nx, xinc_ny, xinc_nz).

Now for the overall timing and interconnection of these triangle processors. At the beginning of each scan line, the global (to each chip) x counter 60 (FIG. 5) is set to 0 (or other initial x value). Then for every clock tick it is incremented by a constant corresponding to the width of a single pixel until the end of the line is reached, at which time several clocks "retrace" time occur. This is when the triangle processors add in their yinc's and check their countdown timers for corners and the end of their triangle. (The name is for convenience, it is in no way coupled to the fly-back time of the color CRT when a frame buffer is used.)

During the x counting time each triangle processor compares the global x count to their left_x value. So long as the global x is less than left_x, any (Z,nx,ny,nz,m) values streaming into the triangle processor from previous triangle processors in the pipe which are active will be passed to the triangle processor's output unchanged. However, once the global x reaches or passes the value of left_x, the triangle processor starts using these computations. From now on, until the global x reaches or passes right_x, during each clock cycle the triangle processor will compare the Z value of the triangle processor's input to the local Z (span_Z), with the lessor determining which (Z,nx,ny,nz,m) packet is sent out the triangle processor's output. When the global x reaches or passes right_x, the triangle processor again becomes quiescent, and will remain so for the rest of the scan line. Due to the sampling model, during the x-counting time each triangle processor will produce new (Z,nx,ny,nz,m) values by incrementing the span registers by the xinc registers regardless of the location of the edges of the triangle.

During a portion of retrace time new triangle creation data packets can be flowing through the pipe. The first free triangle processor they encounter will load itself from the packet, passing no-ops through the pipe beyond it. At the end of the frame all triangle processors are made free and ready for the next frame by hitting them all with a reset command.

Triangle pipe 38 of FIG. 4 requires a large number of identical simple triangle processor machines. Each triangle machine takes care of the details of rendering a single triangle at a time. Statistics indicates that to keep the entire system in balance, on the order of one thousand triangle processors are required. Considerably less than a thousand VLSI chips are needed, however, to obtain one thousand triangle processors. Each triangle processor is a small and simple enough machine to allow several (on the order of 3 to 20 with current technology) of them to be contained on one VLSI die.

Triangle Processor Overall Description

FIG. 7 is a block diagram of a triangle processor 36. X-unit 62 has the job of monitoring the current x-position, comparing it to the left and right edges of the triangle. During retrace period the X-unit will add y-increments to the left and right edge coordinates to bring them to the correct location for the next scan line. The X-unit also counts down the scan lines to the triangles corner (if any), and last active scan line.

Z-unit 64 incrementally computes the distance from the screen to the triangle at each pixel across the face of the triangle (for each scan line). The Z-unit compares this Z value with the winner-so-far for each x-position at the Z-unit Z input. The results of this comparison is sent to CRTL-unit 66. Upon orders from the CRTL-unit, the Z-unit will either pass to the Z output the triangle's Z or the input Z. During retrace time the Z value is incrementally updated to the appropriate value of the Z coordinate at the left hand edge of the screen on the next scan line down.

Nx-unit 68 incrementally computes the value of the x-component of the normal vector of the (curved) triangle surface at each pixel across the face of the triangle (for each scan line). Upon orders from the CRTL-unit, the Nx-unit will either pass to the Nx output the triangle's Nx or the input Nx. During retrace time the Nx value is incrementally updated to the appropriate value of the Nx coordinate at the left hand edge of the screen on the next scan line down.

The Ny-unit 70 performs the same computation as the Nx-unit, but upon the y-component of the triangle's surface normal vector.

Nz-unit 72 performs the same computation as the Nx-unit, but upon the z-component of the triangle's surface normal vector.

MAT-unit 74 stores state information about the triangle, which will be passed on unaltered to the output for each pixel for which this triangle declared "the winner". The state information is not interpreted by the MAT-unit, but includes bits representing a material property index, which indexes a table in the NVS chip with the color and degree of specularity of the surface of the triangle.

CTRL-unit 66 is the control unit for the triangle processor. It is a simple state machine, and takes as input the current state, the command propagated from the previous triangle processor, this triangle processor's configuration bits, the results of the left edge and right edge comparisons, the countdown events, and the results of the Z comparisons. A new state and several control line signals are generated. When the "end of triangle" countdown event expires, the CTRL-unit will go into the state "free", and will wait until a new triangle data packet comes through (during retrace time). The control unit will then sequence the latches within the other units to accept the parameters representing the new triangle.

To conserve pins, data is clocked on and off the triangle processors chip on both edges of the system clock. All other operations are synchronized to just one edge of the clock. Throughout this description, the term "clock tick" and "clock cycle" refer to the full clock. As far as the rest of the chip is concerned, the only change is that there appears to be twice as many data pins as there really are. The term "pixel cycle" refers to a pixel location passing by; this is nominally a single clock cycle. FIG. 7 shows the number of inputs and outputs to a triangle processor as they appear between chips.

The triangle processor's job is to render an image frame, line by line, pixel by pixel. Between frames the chip is reset, so effectively the triangle processors chip only has to worry about a one shot frame. Timing information is communicated to the chip via the four control tag bits. The possible states of these bits and their semantics are described in detail later. A simple description is:

RESET: This reset signal effectively indicates the start of a new frame. All triangle processors are forced into the "free" state (STATE_FREE), awaiting the first command.

ENABLE: This command enables all triangle processors to accept new triangles when they are in STATE_FREE.

SOL: Start Of Line. This signal indicates the start of a new line. Embedded in this multicycle command is the x-position of the left hand edge of the screen. If this follows RESET, it indicates the start of the first line. Otherwise it signals the end of "retrace time", and the start of the next line below the previous one.

EOL: End Of Line. This signal indicates the end of a line, and the beginning of "retrace time". The x-position is at its maximum here.

RAZ: This tag indicates a background pixel is being passed down the pipe at the current pixel position. Its Z location is further away than any valid normal vector pixel.

RAZD: This tag indicates a valid normal vector is being passed down the pipe at the current pixel position.

IDLE: This tag indicates the presence of a bubble in the pipe, or other data.

NEW: This tag indicates that a new triangle creation packet is being passed down the pipe.

EXT: This tag indicates a command which is to be passed through the triangle pipeline for external usage.

These tag values are initially passed into the first triangle processors chip of the triangle pipe by an external controller (part of Y-buffer unit 46 of FIG. 4). Each triangle processor passes these tag bits onto its neighbor unaltered, with two exceptions, but delayed by two clock ticks. Thus tag bits sent into a chip will eventually emerge out the other side. The two exceptions are: a triangle processor in STATE_FREE will convert the NEW tag to IDLE as it grabs the new triangle; a triangle processor in STATE_RAS with a valid pixel will convert the RAZ tag to RAZD as it passes on its output.

Thus the external controller determine the sequencing of the triangle processors. The sequence generated is:
1. A RESET is sent to initialize all the triangle processors to STATE_FREE.
2. An ENABLE is sent to enable all the triangle processors to accept new triangle data.
3. Several padding idles need to be sent to allow the reset to take effect.
4. An EOL is sent to force each chip to take a head count of their available triangle processors.
5. This is the portion of the line timing where new triangle creation packets can be entered into the pipe to find a home. There does not have to be any such triangles sent. If there are some, then they are flagged by the NEW tag. New triangles take 8 clock cycles to be delivered. After the first NEW tag, the values of the seven following tags must be IDLE. Internal state machines will generate "load word 0", "load word 1", ... "load word 7". This is required to reduce the complexity of the internal tag modification circuitry.
6. An SOL is sent to start the first line.
7. This is followed by as many RAZ commands as there are to be pixels in the current frame. This can be as wide as the entire screen width, but any smaller size frame can be computed as well. As far as the triangle processors are concerned, the width of the frame is determined by the number of RAZ commands between receipt of SOL and EOL commands. The EOL command indicators the end of the current scan line, and the start of "retrace time".
8. A few IDLEs must be sent here to allow the triangle processors to perform certain update operations.
9. The cycle now folds back to the activity of loading new triangles.

All the triangle function units other than the MAT and CTRL contain multi-bit addition and/or comparison operations in their inner loop. The sizes of these operations are 18 or 24 bits. This is too long for simple ripple-carry propagation techniques to provide fast operation, but carry look-ahead techniques result in inefficient layouts. The technique chosen is to utilize a fast ripple-carry chain for 12-bits or 9-bits at a time, and latch the carry bit for a clock cycle between 12-bit stages. Thus the 24-bit operations will require two clock cycles to complete, but can be initiated on every cycle via pipelining. Because the results of these operations are required before the final output of the units can be made (i.e. the Z comparison), each unit must buffer its data for two clock cycles so as to have it available when the decision information is available. Fortunately this buffering is achievable via small dynamic latches, which take up less area than carry look-ahead schemes.

Thus each adding function unit is broken up into two sub-units separated by carry latches. Each sub-unit consists of 12 identical one bit function units with ripple-carry stacking inputs and outputs.

There is a great deal of commonality between the X, Z, NX, NY, and NZ units, both in their design and sequencing. The NX, NY, and NZ units are in fact identical other than the wiring of their IO. The Z-unit is almost the same as the normal units, except in that it has a longer word length and an extra comparator. All of these units are completely slaved to the CTRL-unit, there is no local control. Thus it is hard to describe the operation of the data units without also describing some details of the CRTL-unit. The approach taken here is to start with the simplest data unit, the normal unit, and describe its operation in detail, developing details of the CRTL-unit as necessary.

N-Unit

The single bit circuit for a generic N-unit is shown in FIG. 9. The Nx, Ny and Nz units contain identical circuitry. The input at the left on n-bus input 76 is the value of the normal from the previous triangle processor. It is immaterial if the previous unit is on the same die as this triangle processor, or on the previous chip, or if the value is the background initial value fed into the beginning of the pipe. During scan line operation, this value is delayed by two clock cycles by delay units 78, 80 prior to being presented to a winner selection multiplexer 82. The control signal (named we_win) for this multiplexer, like all other control signals in the drawing, is generated by the CTRL-unit and is not explicitly shown on this schematic.

Input 76 is also wired to the input of static latches containing left edge and incremental information for the normal coordinate. These are left edge latch 84, coupled to the n-bus through multiplexer 86, x-increment latch 88 and y-increment latch 90. This path is utilized during triangle parameter load time and is sequenced by CTRL-unit 66.

During the entire rasterization cycling of the triangle processor, the N-unit is held in one control state. In this state, it will repeatedly add the contents of the xinc_n register 88 to a span_n register 92 through multiplexer 94 and adder 96. The span_n register 92 starts out with an initial value loaded from left_n register 84 through multiplexer 98 and added to the contents of xinc_n register 88. Thus a single value is linearly interpolated across every scan line. Now, the only values of spa_n that are of interest are those computed between the left and right edges of the triangle on this scan line (as determined by X-unit 62). All the values interpolated for pixel positions before and after this segment are semantically meaningless and not used, but cause no harm, and are of great help in maintaining correct sampling. The value of left_n has been carefully set up to be offset just the right amount behind the desired values for the triangle innards so that span_n is right in sync when it reaches the real triangle boundary (offsets were included to correct round off error). The processing sequencing of the N-unit is as follows:

(1) As soon as the scan line starts, the CRTL-unit 66 sets up the N-unit multiplexers to present the left_n value to the lower input of full-adder 96 and the xinc_n to the other input. At the end of the clock cycle, the results of the addition will be latched into the output (dynamic) span_n latch 92. This is the first incrementally computed value of n for this triangle (on this scan line) ready for the output if needed at the start of the next clock cycle multiplexing. (The initial left_n value had xinc_n subtracted from it prior to entering the triangle processors chip so that the results of this first addition is the real initial left-n.)

On the next clock cycle the span_n value is fed back into the lower input to full-adder 96 through multiplexer 98, and the xinc_n continues into the upper input. This cycle continues producing updated n values for each pixel, until EOL.

(2) After receiving EOL, and before receiving the SOL tag (start of line), the CRTL-unit declares "horizontal retrace time", even though we have a ping-ponged frame buffer between us and any real CRT fly-back actions. Thus the "retrace time" is just a label, and has nothing to do with any CRT scan delays.

During retrace time, the triangle processor's CRTL-unit 66 will sequence y increment update actions into all units. The N-unit will be directed via setting of the multiplexers and latch signals to add yinc_n to left_n. If X-unit 62 informs CRTL-unit 66 that the triangle is terminated (e.g. the prior scan line was the last scan line that this triangle covered), then CTRL-unit 66 goes into the "free" state, and the contents and state of the N-unit are immaterial.

If the triangle processor goes into STATE_FREE or is already in it, then new triangle creation data packets arriving at the inputs (tag NEW) will cause the CTRL-unit to cycle the data into the appropriate registers of the units, including the N-unit. The exact loading sequence has been tightly optimized to minimize the amount of wasted data bits in a triangle creation packet, and to minimize the complexity of the CTRL-unit. The details of the loading of the N-unit are evident from Appendix I and FIG. 13.

Before each frame, and thus at the end of each frame, the four bit control tag will receive a RESET signal, which cause all CRTL-units to be unconditionally forced into STATE_FREE. This free state transition also has no effect on the N-unit, other than to semantically invalidate its contents.

Nine one-bit N-units are stacked into a single clock cycle ripple-carry nine-bit slice, and two of the nine-bit slices are stacked (with sandwiched carry flipflops) to form the entire 18-bit computation N-unit. The semantics of the nine-bit slice is identical to those just described for the one-bit cell, except that all operations are performed on nine-bit quantities. The semantics of the 18-bit full unit is very similar, except that the 18-bit data word is skewed into two time slices.

The three flipflops left_n 84, yinc_n 90 and xinc_n 88, must be implemented with static latches, because they hold triangle state information that in the worst case can last many milliseconds (e.g., the case of long tall triangles). These latches represent the majority of the area of the N-unit. The control actions needed for these flipflops are only "latch (vs. not) the input value".

The span_n flipflop 92, and the two input n delaying flipflops 78, 80 have their values changed every clock cycle, and therefore can have simpler dynamic latch implementations.

Adder 96 must be a full-adder, as it has both two inputs from the local cell as well as a ripple-carry input from the previous cell. Its carry chain must be optimized for fast propagation of rippling carries, even at the expense of requiring more area and power.

Z-Unit

FIG. 10 is a block diagram of Z-unit 64. The Z-unit is identical to the N-unit except that the Z-unit adds a comparator 100 and a second set of delay units 102, 104. The rest of the computation is the same as in the N-unit, the only other differences are the total number of cells vertically stacked in making the word length, and the timing of the computation.

The job of the Z-unit is not only to interpolate Z values, but also to compare these interpolated values to the incoming Z value from the previous stage, and send the comparison results to the CTRL-unit on line 106. However, it will be two pixel cycles before the comparison results will be available from the upper bits of Z, so the Z-unit must keep a copy of both contestants for this period of time. The we_win results from the CTRL-unit will set output multiplexer 82 to let the winner through.

Notice that the N-unit interpolates its n value based upon the "just in time" principle. Because the normal values are not needed for any comparisons, they do not need to be computed until one clock cycle before they must be present at the output selection multiplexer. The Z-unit must perform its computation two clock cycles ahead. Thus the Z-unit and the normal computational units are two clock cycles apart in time. The CTRL-unit manages this by skewing the time the control signals arrive between the two classes of units. (However the final values of Z and N must get to the "winner" mux at the same time. This is why there are two additional dynamic latches on the Z unit after the span_z register.)

X-Unit

FIG. 8 is a block diagram of X-unit 62. The X-unit shares many concepts with the normal and Z units. But it also has many differences. The first is that the X-unit directly passes on its data input to its data output unchanged, only delayed the requisite two clock cycles. While the other units are incrementally computing values, the X-unit is only performing comparisons. Between SOL and EOL an adder 108 in the X-unit is only used as a second comparator. The CTRL-unit has multiplexer 110 set to send the input X on bus 130 to one leg of full adder 108, and multiplexer 112 set to send the left_x value in register 114 to the other, while a comparator 116 takes in the right_x value in register 118 and the input X from x-bus 120. The final results of these two comparisons are sent to the CTRL-unit on lines 122 and 124, respectively. The numerical output value of the full adder latched into span_x latch 126, but is discarded during rasterization.

The X unit becomes less passive during the "retrace time". Once the CTRL-unit has detected end of line, it sequences the X-unit to do the following:

(1) The multiplexers are set to send the ct_fin register 128 output to one input of adder 108 and x bus 130 (which has the constant −1 on it now) to the other. The results are latched back into ct_fin register 128 through multiplexer 132, and the CTRL-unit is told on line 122 if the results became zero or not. The event being counted down may be either the count to the first corner, or to the end of the triangle, depending upon the state of the triangle (this is kept as part of the state of the CTRL-unit) The rest of the description assumes that the countdown event did not expire.

(2) The multiplexers are set to add yinc_lx from register 134 to left_x from register 114, and the results are latched back into left_x register 114. Yinc-lx is the slope increment for the left side of the triangle.

(3) The multiplexers are set to add yinc_rx in register 136 to right_x from register 118, and the results are latched back into right_x in register 118. Yinc_rx is the slope increment for the right side of the triangle.

The above assumed that the countdown event did not expire (the countdown is one scan line ahead of the rest of the computation). If it did, and it was the real ct_fin, then the triangle has terminated, and the CTRL-unit will go into STATE_FREE, and await a new triangle creation data packet.

If the count did expire, but it was for a middle corner, then one of two different sequences will modify steps 2 through 3 above. If the corner was a right corner, such as shown in FIG. 11B, step 3 is omitted, and the CTRL-unit will add the following actions to step 2:

Direct that three latches will be replaced with their second values: rt/left2_x in register 138 is sent to right_x register 118, yinc2_x in register 140 is sent to yinc_rx register 136, and ct2 in register 142 is sent to ct_fin register 128.

If the corner was a left corner, such as shown in 11A, then it is step 2 that is omitted, and step 3 augmented with:

Direct that three latches will be replaced with their second values: rt/left2_x in register 138 is sent to left_x register 114, yinc2_x in register 140 is sent to yinc_rx register 134, and ct2_fin in register 142 is sent to ct_fin register 128.

Note that rt/left2_x register 138 is used as the second value for either left_x or right_x. Only one register is needed, as any particular triangle has only either a left corner or a right corner (or none), but not both. The same holds true for yinc2_x.

Data Delay and Skewing

One of the more confusing aspects of the triangle processor organization is the way the data is skewed. The following are all true:

1. All data flowing into and out of a triangle processor is skewed every 9 or 12 bit byte, with the least significant byte first.
2. Each triangle processor cause a pipeline delay of two pixels on all bytes of data flowing through it.
3. The normal units compute the value of the normal for a particular x-position two clock cycles after the Z-unit has computed the Z value for the same x-position.
4. The X-unit starts contemplating the bussed global-x value of a pixel two clock cycles ahead of the Z-unit receiving the associated Z value.

At first glance it may seem that one does not both need skewing and delay, but both are needed to make the triangle processors stack properly. The data is pre-skewed on pin input, and de-skewed on pin output, so that between chips the data is non-skewed.

The control, Z, and N information enters each triangle processors chip in parallel all during the same clock cycle (actually double clocked). It takes the control unit four (pipelined) clock cycles to act upon a command, causing control signals to direct computation in the X, Z and N units.

The clock sequencing is as follows:

(1) The first clock cycle is required for the encoded four bit command to be decoded into strobes indicating one of the eight commands that the triangle processor responds to.

(2) During the second clock cycle these strobe signals are considered along with various pieces of internal state, and a new state node is chosen.

(3-14) During the third clock cycle the new state node selects a line of ROM in the microcode store, and during the fourth cycle the ROM contents are read out into the control buffers for the X, Z and N units.

(5) During the fifth clock cycle the control signals from the ROM actually take effect upon the data in the A segments of the X, Z and N function units.

Thus, it will take four cycles from receipt of command to action. This requires commands to arrive four clock cycles before their data does.

Because the incoming commands are simultaneously received with their associated data, to achieve the four cycle relative delay the data must be shunted off into a four cycle long shaft register while the associated command is sent ahead into the control pipe. (Actually only three of the delaying dynamic latches are at the input, the fourth is in the skewing logic.)

Triangle Processor Sequencing

The X unit is set to be computing ahead of the Z and N units. This ensures that the "in-triangle" indication is available at least one full clock cycle before it is needed.

(Thus two cycles ahead of when Z starts computing was chosen.)

The Z unit must be computing its interpolation and Z compare ahead of the N unit. This is because the decision on passing on the local interpolated N value vs. the input N value is based upon the results of the Z unit comparison. This comparison takes two cycles to complete, and not allowing any extra cycles for control action, two cycles must elapse from the start of computation by the Z unit before the N unit can start. The output mux computation of the Z unit is in sync with the N unit, and also occurs at this later time.

Thus, marking as 0 the cycle at which the command for a pixel arrives (RAZ or RAZD), the following is computed during the indicated cycles (with A and B indicating segments A and B):

0: decode command
1: select next state
2: select u-code ROM, XA starts
3: read u-code ROM, XB
4: ZA
5: ZB
6: NA, (ZA)
7: NB, (ZB)

Z Skew N —While most of the N unit control signals are generated by the control unit at the same time as it generates the control signals for the Z unit, control of the two multiplexers needed to control interpolation (the two input muxes to the adder) on the N unit are slaved to those of the Z unit, coming out of ZB. Thus control of this phase to the N unit is skewed by two clock cycles from the operation of the Z unit. This, among other things, allows the N unit to drain real computed data after the Z unit has finished the current line. The delay of the data in the N unit compared to the Z unit is accomplished by the fact that the Z unit interpolates its data in sync with the Z input data first entering the Z unit, while the N unit interpolates its data in sync with the N input data exiting the two delay flipflops.

The rest of the control lines to the N unit are non-delayed, directly controlled from the control processor, and not the same as the Z lines. The two shared control lines make the control of the N unit a bit tricky. The approach is to let the Z unit use the lines as it needs, and then two cycles later let the N control take advantage of the control sent before by the Z unit. The contention for the lines only shows up in the end of line update of an active triangle. The control action is left_* + = yinc_*, which is broken down into two cycles: select left_* and yinc_* as the inputs to the adder; and select span_* as the input to left_* and signal left_* to latch a new value from its input mux. The shared control lines are used in the first step. Calling the Z unit update cycles in this case Z1 and Z2; and calling the N unit update cycles N1 and N2, the timing of the update actions must be:

0: Z1
1: Z2
2: N1
3: N2.

Given that the X control unit requires 4 cycles to complete its end of line update, no cycles have to be added to support this sharing. (The purpose of which is primarily to simplify the slaved operation of the N unit to the Z during the rasterization sequences.)

The other type of end of line update (aka "2"only affects the x-unit, which requires four cycles, as it has to decrement the new ct_fin.

A newly loaded triangle processor should be ready for business the first cycle after it has finished loading, so SOL can come immediately after the last data cycle of a new load.

Triangle Processor Control Unit

The triangle processor control unit is driven primarily by a state machine as illustrated in FIG. 12. Each of the 29 states is represented by an individual flipflop. When properly operating, a "one" value (positive voltage) will be present at precisely one of these at any one time, indicating that the state machine is in "that" state. Transitions between states are driven by the following:

(1) The four bit command bus, carrying pipelined commands from the Y-buffer and other triangle processors.
(2) The explicit internal state position of the control unit.
(3) Two internal state flip-flops within the control unit.

20 of the 29 states selects a line of microcode ROM. Each such line generates 21 bits of control for the X, Z, and N units. One additional control line is generate by a separate logic section of the control unit. This is the we_win signal. This logic considers:

(1) The comparator results from the Z-unit, and the comparator and adder results from the X-unit.
(2) The explicit internal state position of the control unit.
(3) Six internal state flip-flops within the control unit.

Each of the states in the state machine are described as follows:

STATE_FREE

STATE_FREE is the initial state for all triangle processors. It indicates that the triangle processor does not currently contain a valid triangle. All triangle processors upon receipt of CMD_RESET will unconditionally be forced into the STATE_FREE state, regardless of their current state.

If the enable bit is set within the triangle processor, then upon receipt of CMD_NEW a triangle processor in STATE_FREE will start the accept cycle for the new triangle data, leaving STATE_FREE. All other commands are ignored by a triangle processor that is in STATE_FREE (except CMD_ENABLE). When a triangle processor has finished rasterizing its triangle (the counter(s) have expired), it will branch from STATE_RAS into STATE_FREE on line 150.

A triangle processor with its enable bit cleared will remain in STATE_FREE until after the bit is set, regardless of CMD_NEWs flowing by.

STATE_NEW0 —STATE_NEW7

These eight states oversee the loading of new data into the triangle processor. There is no branching within this sequence, except for the universal forced branching causable by the unscheduled receipt of CMD_RESET.

STATE_NEW7 exits into STATE_IDLE_NEW if the next command is not CMD_SOL (or CMD_RESET), where it will stay until a CMD_SOL arrives. STATE_NEW7 can exit directly into STATE_YINCI0 if the next command is CMD_SOL. This implies that the first CMD_SOL of the SOL sequence can directly follow the last loading of a new triangle, e.g., no idle cycles (CMD_IDLE) necessarily need to be inserted between them.

STATE_IDLE_NEW

This is a holding state for newly loaded triangles waiting for their first SOL. It is entered from STATE_NEW7 when a CMD_IDLE is received, and loops until a CMD_SOL is received.

STATE_YINCI0_STATE_YINCI3

These four states handle the initial processing of a newly loaded triangle. For various reasons, a new triangle cannot just be dropped into the normal YINC sequence until the fifth cycle.

STATE_YINC0 —STATE_YINC7

This is the normal inter-line processing for active triangles. The alternative inter-line sequences merge in with this main one by the beginning of the fifth cycle. After STATE_YINC7, processing directly proceeds into the rasterizing state.

STATE_YINC0 is entered from STATE_IDLE when the triangle is not due to expire or go around a corner.

STATE_YINCL0 —STATE_YINCL2

This is the alternate first three step inter-line processing sequence for a triangle changing its left edge between the previous scan-line and the next.

STATE_YINCL0 is entered from STATE_IDLE when the triangle is due to go around a left corner.

STATE_YINCR0 —STATE_YINCR1

This is the alternate first two step inter-line processing sequence for a triangle changing its right edge between the previous scan-line and the next.

STATE_YINCR0 is entered from STATE_IDLE when the triangle is due to go around a right corner.

STATE_RAS

This is a rasterization state. So long as the incoming command is CMD_RAZZ (indicating either RAZ or RAZD), the processor will stay in the rasterization state, computing output pixels.

Receipt of CMD_EOL will cause control to pass to either STATE_IDLE or STATE_FREE, the later being operative when the triangle was due to expire.

STATE_IDLE

This is where a triangle processor rests between the rasterization of the previous line and the SOL sequencing for starting the next. It is initially entered from STATE_RAS upon receipt of CMD_EOL, and control will stay in STATE_IDLE until a CMD_SOL is seen. From here one of the three non-idle-new YINC sequences are entered, depending upon the type of update required. STATE_IDLE is also where allocated triangle processors wait while new triangle data flows by.

Appendix I is a high level description of the microcode indexed by the state machine of FIG. 12. Appendix II is an explicit listing and naming of control signals for the function units of FIGS. 8, 9 and 10.

N-Unit Registers

The left_n register contains the triangle's surface normal vector for the left edge of the current scan line. The left_n vector register has the three 18-bit fixed point component registers left_nx, left_ny, and left_nz. The left_n register should be initially loaded with the surface normal vector of the point on the triangle that is at the intersection of the left edge of the triangle and the uppermost (e.g., first) integral scan line that crosses this triangle, minus the value of xinc_n times (the integral x location of this intersection plus one). The plus one is needed because of internal ALU start-up requirements.

Because the surface normal is a vector valued function defined on a 2D surface, the derivative of this function is a tensor, e.g., a vector derivative for the x direction, and a vector derivative for the y direction. The incremental interpolation versions of these values is represented by two vectors: xinc_n and yinc_n. xinc_n represents the incremental value to add to the interpolated surface normal vector (scan_n) to move it a step in the x direction. Thus, xinc_n is utilized once per pixel on every scan line. yinc_n is the corresponding value for movement in the y direction. It is utilized once per scan line, during retrace time. The value of yinc_n contains the pure y-axis vector derivative. Because of the number of times that these increments are repeatedly added into the same summation per triangle, all 18 bits are available for specification at load time.

The span_n vector register is a dynamic internal temporary register, and is not directly specified by the triangle initial state load map shown in FIG. 13. span_n is the accumulator into which the actual values of N across the scan lines on the face of the triangle are computed.

Z-Unit Registers

The Z distance from the screen to the triangle surface (in scaled distance units) is processed by several 24-bit registers. Other than their bit size, the Z registers could be viewed as a fourth component of the N vectors.

While all the Z computations are carried out on signed 24-bit numbers, only 20 bits of Z are brought out the output pins during rasterization. This trade-off is made because these lower bits rapidly become invalid as round-off errors accumulate from repeated accumulation during the interpolation processes. 20 bits of honest Z seems enough for most applications.

The Z values are interpreted such that smaller values are closer, while larger values are further away. Because Z is signed, the Z locations nearest the screen are negative, while those near the far clipping plane are positive. (Though note that under the projective geometry system employed, the Z values being interpolated actually correspond to k1-k2/Z.)

The left_z register contains the distance to the left hand edge of the triangle on the current scan line minus the value of xinc_z times (the integral x location of the left hand edge plus one). It is updated from line to line by yinc_z.

The xinc_z register contains a quantity to increment the value of Z when stepping in the x direction (during rasterization of a scan line). The yinc_z register contains a quantity to increment the value of Z when stepping in the y direction (during retrace time).

The span_z register is a dynamic internal temporary register, and is not directly specified by the triangle initial state load image. Span_z is the accumulator into which the actual values of Z across the scan lines on the face of the triangle are computed.

As the whole point of the Z-unit is to interpolate and compare the Z position of triangle against another, the question arises of who wins during a tie?

It should first be explained why this question is only of academic interest. Because there are no ordering guarantees in the system, any given pair of triangles may end up in the pipe in either order. Thus, any tie-decision will be asymmetric. It is also the case that while Z computations are carried out to 24 bits of accuracy within the Z-unit, only 20 bits of Z are brought in from off chip due to pin constraints. Thus, a tie case is only truly a tie case in 1 of 16 occurrences. In the others, the tie only occurs because the incoming Z has had four bits of Z truncation, and really was larger.

Given this background, the preference is given to the local triangle as being the nearer, and thus the winner, in tie cases.

X-Unit Registers

The X registers differ in organization from the N and Z registers. There is no "xinc" value, as no interpolation occurs during the rasterization. There is a left_x register, but there also is a right_x register. Both of these have a "yinc" register (yinc$_{13}$ lx and yinc_rx, respectively), and the rt/left_x register can replace either left_x or right_x, depending upon the triangle type being NEW_LEFT or NEW_RIGHT.

The X unit has two additional registers: ct_fin and ct2. These jointly specify the y height of the triangle.

Like the Z registers, the X registers are 24 bits in length. With the exception of the ct_fin and ct2 registers, for which only 16 bits are needed, causing only 16 bits to be externally specified, all 24 bits are always specified for all X registers.

The left_x register contains the x location of the left hand edge of the triangle on the current scan line. It is initially loaded with x location of the intersection of the left hand edge of the triangle and the uppermost integral scan-line the intersects the triangle.

During each retrace time, the contents of left_x will be updated by adding in the value of the yinc_lx register. This will effect the move of the x location to the next scan line down on the left edge of the triangle. For triangles of type NEW_LEFT, the contents of left_x will be replaced by the contents of the rt/left2_x register during the retrace time just before the first scan line after the middle left vertex of the triangle is encountered.

During the inner loop of processing (rasterization, generation of normal vectors and Zs), the value of left_x is not interpolated, but instead is utilized as a boundary value to be compared against the global broadcast x_count. So long as the current value of left_x is greater than x_count, the triangle processor will remain quiescent, not substituting N and Z values.

The right_x register contains the x location of the right hand edge of the triangle on the current scan line. It is initially loaded with x location of the intersection of the right hand edge of the triangle and the uppermost integral scan-line that intersects the triangle.

During each retrace time, the contents of right_x will be updated by adding in the value of the yinc_rx register. This will effect the move of the x location to the next scan line down on the right edge of the triangle. For triangles of type NEW_RIGHT, the contents of right_x will be replaced by the contents of the rt/left-2_x register during the retrace time just before the first scan line after the middle left vertex of the triangle is encountered.

During the inner loop of processing (rasterization, generation of normal vectors and Zs), the value of right_x is not interpolated, but instead is utilized as a boundary value to be compared against the global broadcast x_count. After the current value of right_x becomes less than x_count, the triangle processor will again become quiescent, and not substituting N and Z values.

For the X unit there are no "zinc" values, but two "yinc" values. yinc_lx is the value added to left-x during re-trace time to move it to the left edge of the triangle on the next scan line down. For triangles of type NEW-LEFT the value of yinc_lx will be updated by the yinc2_x register when a middle left corner is encountered. (This register is not called yinc2_lx because it does double duty as the yinc2_rx register.)

yinc_rx is the value added to right_x during re-trace time to move it to the right edge of the triangle on the next scan line down. Because any particular triangle can have a middle vertex on only one of the left or right edges, the yinc2_x register does double duty as also a yinc2_rx register when the triangle is of type NEW_RIGHT, and will overwrite the yinc_rx register.

rt/left2_x is the secondary register for left_x or right_x, depending upon the triangle class. In triangles of class NEW_LEFT, rt/left2_x contains the x location of the intersection of the new left edge of the triangle and the first scan line after the middle left vertex. During re-trace time on the scan line before this scan line is reached, the contents of rt/left2_x are latched into the left-x register.

When the triangle is of class NEW_RIGHT, rt/left-2_x becomes a virtual right 2_x register. For NEW_RIGHT triangles, rt/left2_x will contain the x location of the intersection of the new right edge of the triangle and the first scan line after the middle right vertex. During re-trace time on the scan line before this scan line is reached, the contents of rt/left2_x are latched into the right_x register.

Four types of triangles may be presented to the triangle processors as follows:

(WT) WIDE TOP: The top two vertices of the triangle fall between the same two integral y coordinates.

(WB) WIDE BOTTOM: The bottom two vertices of the triangle fall between the same two integral y coordinates.

(NL) NEW LEFT: All three vertices fall between different pairs of integral y coordinates, and the middle vertex is to the left of the line segment between the other two vertices.

(NR) NEW RIGHT: All three vertices fall between different pairs of integral y coordinates, and the middle vertex is to the right of the line segment between the other two vertices.

For triangles of classes WIDE_TOP and WIDE_BOTTOM, the rt/left2_x register is not used.

The yinc2_x register works in conjunction with the rt/left2_x register. yinc2_x is the secondary register for yinc_lx or yinc_rx, depending upon the triangle class. In triangles of class NEW_LEFT, yinc2_x contains the slope of the new left hand edge of the triangle after the middle left vertex. During re-trace time on the scan line before this scan line is reached, the contents of yinc2_x are latched into the yinc_lx register. Thus yinc2_x in this case is a virtual yinc2_lx register.

When the triangle is of class NEW_RIGHT, yinc2_x becomes a virtual yinc2_rx register. It contains the slope of the new right hand edge of the triangle after the middle right vertex. During re-trace time on the scan line before this scan line is reached, the contents of yinc2_x are latched into the yinc_rx.

For triangles of classes WIDE_TOP and WIDE_BOTTOM, the yinc2_x register is not used.

The 16 bit ct_fin register represents the height in units of scan lines of the triangle for triangles of type WIDE_TOP and WIDE_BOTTOM, and represents the number of scan lines before the middle vertex for triangles of type NEW_LEFT and NEW_RIGHT. In triangles of these last two types, the register ct2 represents the number of scan lines in the remainder of the triangle, e.g. from the middle vertex down to the end of the triangle. For triangles of WIDE_TOP and WIDE_BOTTOM, the ct2 register is not used (but should be loaded with −1 to help the y-buffer).

In particular, the numeric representation of these counts is positive integers one less than the integral scan line difference between the vertices. As an example, a NEW_LEFT triangle whose first left edge crosses 7 scan lines and whose second left edge crosses 4 scan lines should have an initial ct_fin and ct2 of 7−1 and 4−1 respectively, or 6 and 3.

Because of load-map constraints, the ct2 register is actually specified as a 24-bit value. However, the contents must be the correct sixteen bit value shifted up by four bits, thus having four leading and four trailing zeros.

The span_x register is a dynamic internal temporary register, and is not directly specified by the triangle initial state load image. span_x is an internal buffer register.

Like the z-unit, the x-unit also performs comparison functions. Once again the question arises of who wins tie cases?

Once again the question is rendered almost moot by round-off error, as well as the ability to offset the location of global x by small values to override whatever convention is stated.

Our pixel sampling specifies that pixels are sampled precisely on the points defined by the intersection of integral coordinate grid lines. All such points contained by a triangle are to be rendered by that triangle. But is the edge of a triangle on its inside or its outside? If it is on the outside, then a point precisely on the common edge of two abutting triangles will "fall between the cracks" (literally), and will not belong to either. Clearly this is wrong. If the edge is included, then a point could belong to two triangles. The only other possibility is to have left hand edges belong to triangles, but not right hand edges. This keeps the cracks covered, but only assigns one triangle to any given point (from abutting triangles). This third option is the one selected.

To implement this option, the comparisons must be:
global_x less than left_x
global_x less than right_x A triangle does not participate in a pixel while global_x is strictly less than left_x. Once global_x is greater than or equal to left_x, the triangle is active.

Once this condition is met, the triangle will remain active so long as global_x is strictly less than right_x. Once global_x becomes greater than or equal to right_x the triangle is once again inactive.

It can be seen by inspection that the above rules classify the left edge of a triangle as part of the triangle, while right edges are not. The XTC performs a similar test of the top and bottoms of triangles earlier when assigning a range of active scan lines for a triangle.

Other Registers

The mat register is a 9-bit register containing a material index value for the triangle. In a simple case, this value can be thought of as the "color" of the triangle, but in reality other material properties (shininess, etc.) are also indexed by this number.

The mat register is not subject to any interpolation, and is just a symbolic tag along for the ride until the shading computation is performed by the Normal Vector Shader chip down the pipe from the Triangle Processors. Its value will be passed to the output along with the winning Z and N values when this triangle processor's Z value indicates that it is the local "winner." All 9 bits are specified by the initial triangle load-map.

While the ninth bit of the mat register is included here, it will also be associated with the config register in the load-map. These are both the same bit, it is the packing details of the load-map that causes the confusion.

The previous registers mainly describe the geometric state information for the individual triangle processor. The rest of the behavior of the triangle processor is controlled from the configuration register. Here reside bits to control transparency, triangle class, and test. The 8-bit config register contains four subgroupings of control bits. We will deal with each in turn.

Two bits, tt1 tt2, are utilized to specify the triangle's class. They are arranged so that one of the bits indicates if the triangle has a middle vertex or not. The bit assignments corresponding to the classes are:

| tt1 | tt0 | Class |
|-----|-----|-------|
| 0 | 0 | WIDE_BOTTOM |
| 0 | 1 | WIDE_TOP |
| 1 | 0 | NEW_LEFT |
| 1 | 1 | NEW_RIGHT |

Because the triangle processor is really a trapezoid processor, it does not differentiate between the classes WIDE_BOTTOM and WIDE_TOP, though the XTC pipe certainly must.

Four bits are used to specify a transparency pattern for the triangle. The bits represent a direct encoding of a 2×2 transparency screen. This is a repeating mask stippled across the image, with the bit of the mask indexed by the low order x location bit and the low order y location bit. These bits indicate the amount of pixel coverage (which is all or nothing for binary), thus a "1" indicates that this triangle should win; conversely a "0" indicates that this triangle will take a dive. Setting all four bits to one's indicates a non-transparent triangle, zero bits indicate "holes" where triangle from behind (of greater Z) can shine through.

During rasterizing, the choice between [tr_11, tr_10] and [tr_01, tr_00] is determined by bit 0 of the global y location (scan line number, starting from 0). The remaining choice is determined by bit 0 of the global x location (starting from 0 at the left edge of the image). Because of the alignment to the global x and y locations, masks on completely different triangles will be aligned in their positioning. (Global y is not broadcast, the "even-odd" line bit is derived on the fly by each triangle processor.)

There are 16 possible different masks, representing 5 different degrees of transparency (4 usable) of differing "phases."

By assigning backfacing transparent surfaces a different transparency bit pattern than front facing triangles of the same material, correct "folded" transparencies can be generated.

When the last triangle processor on a particular chip has its test bit set, internal data not normally output is placed upon the output pins in place of the normal data. This is the only method for gaining access to certain internal values. During normal processing, this bit should always be set to zero. Setting of this bit in triangle processors that are not the last has no effect, but due to the complexities of processor assignment the destination triangle processor for a particular packet of NEW triangle data is not tracked, and thus any triangle data packet could land on the last triangle processor on a chip.

The enable bit (enable flipflop 59 in FIG. 5) enables a triangle processor to accept new triangle data if it is otherwise free. There are two ways to load the enable bit: explicitly via setting the bit within the config register within a NEW triangle load packet; and via sending the global ENABLE command to the pipe of triangle processors. This second method always results in the enable bit being set to one. For normal processing, all new triangle load packets should have the enable bit set to one. The enable bit should only be set to zero only as part of test programs or initialization programs with a prior knowledge of the location of bad processors.

Bad Triangle Mapping

The inclusion of a per triangle processor enable bit allows "bad" or defective triangle processors to be mapped out. This can be used to improve the yield of semiconductor die with multiple triangle processors on them.

One of the main defect occurrences during IC fabrication is point defects, causing small isolated failures in one of the several layers of wiring and transistors utilized in making the IC. While all of a triangle processor must be fabricated correctly for it to properly process triangle data, only a small portion of the processor need be functional for it to pass data from its input to its output. Thus, if only one of seven triangle processors on a particular IC has a defective Z comparator, the other six processors can still be utilized within a triangle processor pipe so long as no triangle data is ever loaded into the defective processor. The enable bit allows known defective triangle processors to defeat the first come, first served model of processor allocation by never accepting triangle data. This will often allow triangle processors chips to still be utilized in functioning systems even when one or more point defects occur during IC fabrication. Thus, more usable chips are produced per silicon wafer, lowering the cost of the final devices.

To map out bad processors, one first needs to know where they are within the pipe of perhaps several hundred triangle processor chips. While each chip could be marked during initial IC testing, it would be safer to re-test the entire pipe at power up time utilizing the internal test capabilities of the chip to determine which processors to map out.

To disable these processors, one first prepares the triangle pipe with a RESET command followed by an ENABLE command, enabling all triangle processors, both good and bad, to load new triangle data. Then one simply loads as many dummy triangles as there are total triangle processors in the pipe, but with the enable bit turned off in those dummies corresponding to the pipe location of the bad processors. In this special circumstance we can know which triangle data packets will be loaded by which triangle processors, because all triangle processors are initially available, and the packets will be picked off in order by the processors.

After the bad processors have been mapped out, we are left with what will function as a normal triangle pipe, except with fewer processors. During all subsequent processing the bad processors will stay quiescent, acting as shift registers.

Note that the only parts of a bad triangle processor that must be in proper operating order to allow its neighbors to still function are:

For the n-unit (FIG. 9), dynamic latches 78 and 80, and multiplexer 82.
For the z-unit (FIG. 10), dynamic latches 78 and 80, and multiplexer 82'.
For the x-unit (FIG. 8), dynamic latches 78' and 80'.
For the control unit, enough of the circuitry to allow the enable bit to be set and cleared, and to allow normal commands and data to be just passed through.

Because the triangle processor circuitry is not 100% redundant, certain single point flaws in critical areas (such as shorting out power lines) will make the entire chip unusable. However, statistically, a large number of normally fatal (for other types of chip) defects will still allow a triangle processor chip to be used.

Triangle Processor Sequencing Detail

The process of causing a pipe of triangle processors to rasterize a batch of triangles must be broken into several states. Transition between these stages (and additional information) is sequenced by changes on the four command lines ICMD.

The RESET command causes all triangle processor chips to immediately transition to the internal state FREE, forgetting any previous state and triangle information, with the exception of the setting of the enable bit. This is the master reset command for the Triangle Processors chip, appropriate not only after power up, but also at the beginning of every FRAME of rasterization. In this fashion we start out with a clean slate within the Triangle pipe for every image.

The RESET command does not have any data pin requirements. When it hits, the last thing the individual triangle processors are thinking about are the data lines.

The ENABLE command sets the enable bits in all the triangle processors. The only other way this bit is modified is via individual new triangle loads, when the enable bit is set as part of the load map.

The ENABLE command does not have any data pin requirements. The ENABLE command should be applied after the RESET command. While the ENABLE command will unconditionally enable a triangle processor, a wild running triangle processor has the power to un-enable itself. The recommended power on sequence is a RESET followed by an ENABLE, followed by some number of IDLE's followed by an EOL, optionally followed by a string of NEW triangle commands to selectively disable known bad triangle processors.

The IDLE command indicates a no-op. It is mainly available to allow the Y-Buffer to insert bubbles between NEW commands if extra time is needed (It is also used to pad new packets). There are no data requirements, though usually any data present will be passed through un-altered.

The NEW command indicates that data for a new triangle is present. NEW commands must come in as a sequence of one NEW command followed by seven IDLE commands in a row, without any gaps or other commands in between.

As each 60-bit word transfer to the Triangles Processors chip includes 56 data bits (60−4 cmd), the eight NEW+IDLE commands represent a data structure of 448 bits. These 448 bits contain all the state information to set up a new triangle within some triangle processor. The exact layout of this triangle "load-map" is described later with reference to FIG. 13.

When a FREE triangle processor sees a NEW command, it will load the 448-bits of data from the 8 contiguous NEW+IDLE command into itself, and will pass forward 8 IDLE commands to the rest of the pipe. Thus it effectively changes the 1 NEW +7 IDLE commands into 8 IDLE commands as far as triangle processors further up the pipe are concerned.

An arbitrary number of IDLE commands are allowed in between any batch of 8 NEW+IDLE commands, if needed by the Y-Buffer. The intention, though, is to pack new triangle data as close together as possible.

The SOL command indicates the header that immediately precedes the start of rasterization of a scan line. This header will impart 4 pieces of 24-bit data on four different words. In order to simplify the handling of this data by the Y-Buffer, and to include certain minimum pipeline padding requirements, this line header is made to look like an 8 word new triangle data package, and thus can be stored in the Y-Buffer just like a triangle, and sequenced out as the last "new triangle" on every scan line. (It can be a final shared datum of every chain of NEW commands. It could also be synthesized on the fly by the Y-Buffer, etc.)

The RAZ command causes rasterization to commence. The Y-Buffer should feed as many of these into the triangle pipe as pixels are desired on the current scan line. The first RAZ must immediately follow the last of the 8 SOL commands, and the last RAZ must precede the EOL command, indicating the end of the line. There must be no gaps or other commands in the sequence of RAZ commands.

RAZ means that this pixel is a virgin pixel from the Y-Buffer, and any triangle containing this pixel location should be by definition in front of it. The Normal Vector Shader chip will recognize a "RAZ" command as indicating a pixel that ran the gamut of the triangle pipe without being obscured by any active triangle(s), and perform the shading calculation for "background" to generate an RGB-Z value. Thus there is no need to fake a normal vector as well.

The RAZD command is what a triangle processor generates when it injects a pixel (material, Z location, and normal vector) into the pipe due to discovering that it covers the current pixel location. As the initial contiguous stream of RAZ commands progress through the pipe, they are replaced by RAZD commands as triangles rasterize themselves. Thus the output of the triangle pipe will be a stream of RAZD commands wherever any triangles were visible on this scan line, and RAZ commands on pixel locations no triangles covered. The Normal Vector Shader chip processes RAZD commands differently from RAZ commands, RAZD commands indicate that a real normal vector is present to shade. Summarizing: at the input to the triangle pipe, RAZ is always the case, at the output RAZD indicates computed normal vectors. Both RAZ and RAZD are turned into NVS's RGBZ command by the NVS, so the frame buffer should never see them.

The EOL command indicates that rasterization is over for this line. A single EOL should terminate a string of RAZ's in the overall timing. The EOL command also causes the Triangle Processors chip to count up the number of triangle processors on that chip that are free and available to receive new triangle data. Thus an EOL is also required before the first new triangle data of the first line.

Now that the individual triangle processor commands are understood, the constraints upon their sequencing can be described. It is assumed that any disenabling of defective triangle processors has already been performed, and will not effect any of the following. The following does not take into account the needs of guard band processing. The changes are straightforward.

The rasterizing of an image frame always begins with a RESET command. Even though all triangles should have died after the last line of the previous frame, this insures that fact.

After the RESET, some number of IDLE commands followed by an EOL command are required to correctly initialize the chips.

Next the new triangles that are active during the very first scan line are to be sent down the pipe. As mentioned above, the packets of 8 NEW+IDLE commands representing a single new triangle may be separated from one another by zero or more IDLE commands.

After all the new triangles have been sent down the pipe, the SOL packet must be sent. It may be preceded by zero or more IDLEs or EXTs, (filling between the last IDLE of the new sequence and it), but the very next command after the last of the 8 SOLS must be the first of the line full of RAZ. If there are no triangles destined for rasterization on the first scan line, the EOL may be immediately followed by the SOL packet. The SOL packet contains internal idle cycles to get the pipe ready.

Next, the same number of RAZ's should be sent as there are (to be) pixels in the current scan line. (This width is usually constant for all scan lines in a given frame. A minimum of a single RAZ must be given.)

After the last RAZ has been sent, the processes are ready to begin over again with an EOL and zero or more packets of new triangle data ±or the next scan line followed by the SOL packet.

The sequencing continues in this mode until the last scan line of the current frame has been rasterized. 3 cycles after the last RAZ command the RESET command to begin the next frame may be sent (the pipeline limitation again).

This completes the description of the state of events as far as the Triangle Processor chips are concerned. However, commands for the Normal Vector shader chip, the frame buffer, and other processors at the end of the triangle pipe would like to get some commands too.

Non-Triangle Processor commands have several reserved "external" EXT command numbers, but are treated as "IDLE" commands by the triangle processor. They may be inserted in any place that IDLE commands are allowed by the triangle processors sequence, except where the three IDLE commands are mandated. IDLE and other commands placed there will not have their data bits preserved at the end of the pipe. At all other times and places, IDLE and external commands will have a 56 data bits passed on un-interpreted by the triangle processor.

While this leaves many places to insert EXT commands, the Y-Buffer controller will most likely confine them to before and/or after the batch of NEW triangles during re-trace, and after the last scan line (after the three padding IDLEs). The normal vector shader will usually require its V parameters to be updated once per frame, and the frame buffer most likely will need some indication of where to put each frame, as they will be of different sizes and locations for windows. There most likely will be data paths to the frame buffer that by-pass the triangle pipe, but for synchronization purposes some commands will be more natural to come through the triangle pipe.

It must be remembered that the strings of 1 NEW +7 IDLE's will not all be the same length, but will vary (in multiples of 8) with the number of new triangles in the input que at the time.

The Triangle Pipe can build up considerable pipeline delay. Each Triangle Processor contributes 2 cycles of clock delay, and every Triangle Processors chip input and output adds an additional 6 cycles of clock delay. At 3 Triangle Processor's per chip, this adds another 2 clock cycles of delay per processor, for a total of four cycles of clock delay. For example, a pipe of 1000 triangle processors at 20 MHZ would have a delay of 200 micro-seconds. Once the Y-buffer starts the rasterization of a scan line via SOL, the frame buffer is committed to receive a line of pixels with no gaps, 200 micro-seconds later. This stream of data cannot be paused by the frame buffer. It cannot even be interlocked on a line-by-line basis, as for even 1000 pixel wide images several scan lines will be simultaneously in the pipe. (The actual pipeline delay must also take into account the delay of the NVS chips and others also in the rasterization pipe.)

When new triangle data is to be loaded into a triangle processor, the data must be properly formatted into 8 56-bit words. The "load-map" for this data is shown in FIG. 13.

This is the data structure stored on the Y-Buffer. The numbers at the left and right indicate bit positions of the data structures in terms of the virtual pins. The bit-order of the data is the same as the virtual pins, e.g. low order bits at top.

Each column of FIG. 13 contains 60 bits, which must come in over two clock signals (one clock cycle). These bits use the same input pins as are used for data flow during rasterization. Eight clock cycles (of two multiplexed inputs each) are required to input the data of FIG. 13, which is then routed to the appropriate units of the triangle processors for loading into the appropriate registers to get ready for the rasterizing data flow. The destination units are indicated in parenthesis in FIG. 13. As can be seen, the Z-bus receivers inputs on "virtual" pins 36–59, the Nx, Ny and Nz busses on pins 6–59, the MAT and CTRL units on pins 4–12. The x-bus data shows up on pins 4–59, and is routed through the G-unit (see FIG. 5) on busses e2 (pins 4–11), e1 (pins 36–59) and g (pins 12–36).

The format of the fields is always the same. Fields that are not used for some triangle classes, like all "2" registers for triangles of class WIDE_TOP and WIDE_BOTTOM, are still present, but can be filled with any data. (NOTE: it is recommended that the ct2 register be filled with −1 when not being used. This helps the y-buffer in its longevity computations).

There is no information present to mark a triangle for any particular triangle processor, triangle processors are allocated within the pipe on a first come, first serve basis. If too many triangles are sent into the pipe, the only indication is that data tagged NEW will appear at the end of the pipe. Normally when a free triangle processor is encountered by NEW data, the triangle processor will pass 8 IDLE commands on in place of the NEW triangle data, i.e. change NEW to IDLE. Thus the frame buffer, which already is looking at the triangle pipe control signals, should raise an error if it ever sees "NEW". (The assumption is that the NVS chip will pass extraneous NEWs right through).

The highest bit of config (relative to the load map, semantically this is the seventh bit of config) is a test enable bit. This should be zero during normal sequencing. It is set only during IC die test after fab, and by advanced board diagnistoic software.

The second highest bit with the eight-bit section labeled config is semantically not part of config at all, but in reality the ninth bit of the mat register. (See the description of the config and mat register for more details.)

The one bit enable flag appears as the upper bit of the spare eight-bit field during the first word of the load-map, but semantically is the eighth bit of the config register.

G-Unit

The unique use of triangle processors allows the x-positions to be run past the processors, which allows the x-position to be readily synthesized on each chip by its G-unit, as shown in FIG. 14. In addition, the g-unit can be used to load data into the x-unit registers from pins normally used for rasterizing data, thus reducing the pin count.

The global-x control unit shown in FIG. 14 is used for two purposes: to assist in the un-packing of new triangle data for the X-units during loading; and to synthesize an on-chip copy of a steam of x pixel positions. This efficient use of hardware does not come without penalty; the sequencing of the global-x unit is quite complicated.

The global-x unit is controlled via its three 2-1 multiplexers 150, 152 and 154. The only other control is the latch control signals of the x_inc_g register 156. Unlike the registers in the N, Z, and X units, the latch control to x_ing_g register 156 is not pipelined. Rather, both the A and B segment control signals are individually controllable by the global-x control unit. The same applies to the multiplexer 150 signal, both A and B signals are available. Muxes 152 and 154 coupled to ALU 158 are however pipelined and thus single.

The simplest mode of the G-unit is to just pass the g-bus input to the x-bus output. This is accomplished by setting mux 152 to select the g-bus and mux 154 to select the constant 0. In this mode, the x-unit circuit becomes equivalent to a dynamic latch. However, the transformation into a latch is pipelined, and takes effect in a ripple fashion from the A segment to the B segment. Remember that the e-bus mux 150 and latch 156 are not pipelined in their programming. Also remember that the incoming g-bus has an extra dynamic latch delay on the B segment (and none on the A segment).

Either half of x_inc_g register 156 can be loaded independently by the appropriate setting of e_bus mux 150 and the two latch signals. However, in this case the B segment does not have an additional input delay. This will have to be synthesized by the unit when needed for loading.

The g-unit of FIG. 14 is thus used to load the x-unit register by picking the appropriate input data from one of busses e1, e2 and g and putting the data on the x-bus. During rasterization, the x-count is generated by adding the contents of x_inc_g register 156 to the contents of span g register 160 each cycle, and putting the result onto the x-bus.

Two Triangle Pipes

Two triangle processor pipes can be placed in parallel, with one processing a left half of a display screen and the other processing a right half of a display screen. Such a triangle processor board is shown in FIG. 15. It consists of: An interface 220 to the Y-buffer; two triangle pipes 222, 224 of as many triangle processor chips as will fit on the board (about 100); and an interface 226 to the NVS/Z-buffer board.

The triangle chips are logically organized as two parallel pipelines 222, 224. This organization allows one pipe to be rendering an image while the other pipe is being loaded with new triangle packets from the Y-buffer.

In order for the triangle processor to rasterize a triangle it needs to be loaded with a packet of data that describes the triangle. The packet is computed by the XTC and sent to the Y-buffer. The Y-buffer then controls the loading of the packets on the Y scan line where they become active. Since loading a packet requires some amount of time (8 clock cycles per packet) the pipe is split into two parts. This allows one side to be loaded while the other side is rasterizing. The triangle processor PCB of FIG. 15 is designed to support the two pipe concept.

Input interface sectron 220 receives two separate command/data streams from the Y-buffer, one for the left pipe, and one for the right pipe. Interface 220 will latch this incoming command/data in as 20 MHz TTL levels (60 signals per pipe) and provide output to the triangle chips as 40 MHz multiplexed CMOS levels (30 signals per pipe).

The triangle pipe section is arranged as two parallel pipelines 222, 224 of triangle processor chips, both of which function independently of each other. Command/data input steering to the two pipes is provided by the Y-buffer which has complete and independent control over both pipes inputs. The pipe output steering (merging of data from two pipes into a single stream) is also handled externally by the Y-buffer, and the actual combining of the data streams takes place externally on the NVS/Z-buffer PCB. As a result of implementing these switching functions off the triangle processor PCB, the option of adding extra triangle boards to the system has been provided. This option may be desirable as a performance upgrade for applications with complex images that overflow the triangle pipe.

Output interface section 226 connects directly to the CMOS command/data outputs from the end of the triangle processor pipeline. Interface 226 accepts these inputs as 40 MHz multiplexed signals (30 signals per pipe) and converts them to buffered 20 MHz demultiplexed signals (60 signals per pipe). These buffered outputs will drive either the NVS/Z-buffer PCB or an optional additional triangle processor PCB.

A clock generation section 228 generates a two-phase symmetrical 20 MHz output. This clock will be derived from a global 40 MHz source clock in a manner which guarantees the required phase relationship for interfacing with other system boards. The triangle processor PCB will use this clock to synchronize all data transfers through the pipeline and at the input and output interfaces.

Optional first-in first-out (FIFO) buffers 223, 225 allow both triangle pipes to be loaded at the same time. Data can be loaded into FIFO 223, for instance, during rasterization of a scan line. At the end of the scan line, data can be loaded directly into pipe 224 from the Y-Buffer while FIFO 223 downloads into pipe 222 at the same time. This may permit a faster rasterization, since the speed of rasterizing of one pipe is no longer limited by the loading time of the other pipe.

Sampling

Because many polygon rendering methods evolved from simple polygon fill methods, most do not take proper care to properly compute the "correct" values for each pixel. Our formulation is given as a continuous mathematical function, with precisely defined values at any location within the polygon. Discrete sampling theory tells us that the most accurate images are formed by uniform sampling of well defined points all the same distance apart. The use of triangle processors operating on the same x and y positions guarantees that sampling of the normal vector and z values is based upon the same uniform pixel grid for all polygons, and is not biased by the location of the edges of the polygons. This ensures that the images formed are free of several types of "aliasing" that can be caused by incorrect sampling. For example, if two polygons have their z distance value associated with the same pixel actually sampled at fractionally different x-y locations, the comparison between the z values to determine who's in front can give incorrect results. Errors in sampling the normal vector values can also lead to incorrect images.

The key to correct sampling is to track all the values concerned to sub-pixel accuracy, and arrange for the pixel sampling locations to be uniformly spaced and consistent for all polygons. The present invention achieves the first in part by performing the computations with high accuracy fixed point arithmetic. The second is achieved by starting the interpolation for the normal vector and z values always at the left hand edge of the screen, independent of the boundaries of the polygon. In this way the location of the sample points is forced to be the same for all polygons. While it is true that multiple fixed point summations will produce a certain amount of round-off error, the error produced by all the summations prior to the left hand edge of the polygon can be pre-computed and pre-subtracted out. In this manner the only round-off error will be that caused by the interpolation within the polygon boundaries.

There are other sources of aliasing within image formation systems related to the frequency limitations of only discretely sampling a continuous image once per pixel. The traditional solutions involve sub-pixel sampling and low-pass frequency filtering. It must be mentioned that these techniques do not work well if the pixel sampling accuracy was bad to begin with. Thus the methodology from the previous paragraph is a necessary prerequisite for the employment of these more sophisticated techniques.

By computing several images with the appropriate sub-pixel offsets in pixel boundary locations, and then averaging these images together with appropriate weights, the present invention can support accurate spatial anti-aliasing, including stochastic sampling techniques.

A related improvement is the simulation of motion blur. This involves the aliasing in sampling the image in time. A photographic image of a moving object will show the object blurred due to the extent that the object moves during the time period that the film is exposed. Normal computer generated images represent infinitesimally small exposure times and the images are completely crisp. While this is fine for stills, when generating real-time simulations the lack of blur in successive images results in a strobiscopic effect. By computing multiple images of an object at different locations, and then averaging the images together, a properly motion blurred image is generated. Once again the present invention is suited to the employment of this image improvement technique, using stochastic sampling in time/space.

Triangle Data Tags

What are the possible data compositions of a pixel as produced by a triangle processor covering that pixel? At a minimum the data must include the Z value of the triangle at that point. Additional values depend upon the complexity of the "lighting model" preceding and following the triangle pipe. Roughly in order of increasing complexity, the possible additional data fields are:

(1) An n-bit constant integer associated with each triangle. This allows "flat" shading of triangles, e.g. all pixels of a particular triangle would be given the same color value. This integer could be constant for all possible view angles of the triangle, or an intensity shade could be computed for the current angle between the triangle and the light source(s) on a frame-by-frame basis. This integer will most likely be subject to a pseudo-color look-up after the triangle pipe so as to generate a full 24-bits of RGB color. The range of n is 1 to 24-bits, with 4 to 12 bits being the most likely.

(2) An n-bit integer interpolated across the face of the triangle (The additional circuitry would look like a single n-unit.) This allows diffuse or "Gouraud" shading. The Gouraud shading value would be pre-computed for each of the vertices of the triangle (based upon the angle of the triangle and the light source(s), and the color of the triangle), and interpolation parameters would be computed from these. Once again a post pseudo-color look-up is likely.

(3) Three n-bit integers interpolated across the face of the triangle, representing the final red, green and blue color components of the image. The additional circuitry would look exactly like the three n-units of the current embodiment, the difference in the preferred embodiment is purely in the pre and post processing of the values. Interpolating RGB values across the face of every triangle allows many complex lighting models to be applied prior to rasterization, with no post-rasterization processing. Basically, the desired light model is applied to the three vertices of the triangle, forming a vector field to be interpolated. The limitation is that many lighting models cannot be reasonably approximated by linear interpolation over the relatively large distances between the triangle vertices.

(4) Three n-bit integers interpolated across the face of the triangle, representing the x, y and z components of the normal vector to the surface of the triangle, plus an m-bit constant material tag. The circuitry is the same as before, with the addition of the constant, the difference is in the pre and post processing. The pre-processing is simpler. Rather than apply the lighting model, the three values of the normal vectors at the vertices of the triangle are used to set up the incremental interpolation values. The post processing is considerably more complex. The lighting model must be independently applied to each pixel, before producing the final RGB value. This process will take in the interpolated value of the normal vector, the material tag, the z value of the pixel, properties of the lights, and other parameters as input. (See co-pending NVS application Ser. No. 117,162 for one example.) The material tag can include the RGB color of the material, a degree of shininess of the material, and other factors. Alternatively, these properties can be indexed by a small integer. (The indexed table to be outside the triangle pipe.) This is the approach taken in the preferred embodiment.

(5) Two n-bit integers interpolated across the face of the triangle, representing the x and y addresses into a colored "texture-map" table for the surface of the triangle. In this manner complex markings can be "painted" onto the surface of relatively large triangles. This option would be an addition to, rather than a substitute for, the above options. An alternative mapping utilizes three integers and indexes into a three-dimensional texture table. Another alternative utilizes two integers to interpolate into a table of perturbations to the normal vector of the pixel (as computed above). This can be used to give the appearance of a "crinkly" surface, such as that of an orange.

While the preferred embodiment of the current invention employs the normal vector option, it can be seen that this hardware can be used to support all of the other options other than the last. And by adding two or more additional interpolation channels, a single triangle processor could be built to handle any of the options. Alternatively, the chip implementation of the preferred embodiment could be deployed in two parallel channels, as shown in FIG. 15, with one channel performing the normal computations, while the other duplicates the z interpolation, but computes texture addresses in the n channels.

It must also be mentioned that the preferred embodiment can simultaneously support the normal interpolation and direct RGB interpolations, so long as any particular triangle utilized one or the other. A single reserved material tag is used to indicate that the normal channel could be interpreted as an RGB value for this particular pixel.

Channels of interpolated integers can be used for a number of other purposes, including the simulation of the shadowing of one triangle by others.

As will be understood by those familiar with the art, the present invention may be embodied in other specific forms without departing from the spirit or essential characteristics thereof. For example, polygons other than triangles could be processed, or the triangles could be described with different data, or the number of bits used for the triangle and pixel data could be changed. Alternately, translucent information can be sent by allowing a triangle processor to output two duplicate pixels with different material values and different associated Z positions for a single pixel location when one material is translucent. The additional circuitry to accomplish this would be obvious to one of skill in the art in light of this disclosure. Accordingly, the disclosure of the preferred embodiment of the invention is intended to be illustrative, but not limiting, of the scope of the invention which is set forth in the following claims.

APPENDIX I

Triangle Processor State Actions

| State | latchN | latchZ | aluZ | latchX | aluX |
|---|---|---|---|---|---|
| Yinc0 | | | | | right__x+yinc__rx |
| Yinc1 | | left__z=span__z | left__z+yinc__z | right__x=span__x | left__x+yinc__lx |
| Yinc2 | | | | left__x=span__x | ct__fin+x__bus |
| Yinc3 | left__n=span__n | | | ct__fin=span__x | |
| Yinc4 | idle | | | | |
| Yinc5 | idle | | | | |
| Yinc6 | idle | | | | |
| Yinc7 | | | left__z+xinc__z | | |
| Yinc2r0 | | | left__z+yinc__z | right__x=left2__x | |
| Yinc2r0 | | | | yinc__rx=yinc2__x | |
| Yinc2r1 | | left__z=span__z | | ct__fin=ct2 | left__x__x+yinc__lx |
| Yinc2r2 | goto Yinc2 | | | | |
| Yinc210 | | | left__z+yinc__z | ct__fin=ct2 | rihgt__x+yinc__rx |
| Yinc211 | | left__z=span__z | | right__x=span__x | |
| Yinc211 | | | | yinc__lx=yinc2__x | |
| Yinc212 | | | | left__x=left2__x | ct__fin+x__bus |
| Yinc213 | goto Yinc3 | | | | |
| Yinci0 | idle | | | | |
| Yinci1 | idle | | | | |
| Yinci2 | | | | | ct__fin+x__bus |
| Yinci3 | | | | ct__fin=span__x | |
| Yinci4 | goto Yinci4 | | | | |
| New0 | | left__z=z__bus | | left2__x=x__bus | |
| New1 | | xinc__z=z__bus | | left__x=left2__x | |
| New1 | | | | left2__x=x__bus | |
| New2 | | yinc__z=z__bus | | right__x=left2__x | |
| New2 | | | | left2__x=x__bus | |
| New3 | left__n=n__bus | | | ct2=x__bus | |
| New4 | | | | ct__fin=ct2 | |
| New4 | | | | yinc2__x=x__bus | |
| New5 | xinc__n=n__bus | | | yinc__lx=yinc2__x | |
| New5 | | | | yinc2__x=x__bus | |
| New6 | | | | yinc__rx=yinc2__x | |
| New6 | | | | yinc2__x=x__bus | |
| New7 | yinc__n=n__bus | | | ct2=x__bus | |
| Raz | | | span__z+xinc__z | | left__x<x__bus |
| Idle | | | | | |

APPENDIX II

GSP-NVS Δp CONTROL SEQUENCING

Control signals for the nx, ny and nz units:

load__xinc__n
    This signal causes the contents of the n-bus to be latched into the xinc__n register.
load__left__n
    This signal causes the output of mux__to__left__n to be latched into left__n.
load__yinc__n
    This signal causes the contents of the n-bus to be latched into the yinc__n register.
mux__alua__n
    These signals shunts the a leg input mux of the n-unit adder to select the contents of xinc__n or yinc__n.
mux__alub__n
    This signal shunts the b leg input mux of the n-unit adder to select the contents of left__n or span__n.
we__win
    THis signal set the final winner output mux mux__win__n to select the contents of span__n or the contents of dl2__n.
mux__left__n
    This signal selects the value of n-bus or span-n as the input to the left__n register.
carry__in__n
    This is not a control signal, but the ripple carry between stages.
There are 7 control lines, plus the carry signal, plus the clocks.

Control signals for the Z unit:

load__xinc__z
    This signal causes the contents of the z-bus to be latched into the xihc__z register.
load__left__z
    This signal causes the output of mux__to__left__z to be latched into left__z.
load__yinc__z
    This signal causes the contents of the z-bus to be latched into the yinc__z register.
mux__alua__z
    These signals shunts the a leg input mux of the z-unit adder to select the contents of xinc__z or yinc__z.
mux__alub__z

APPENDIX II-continued
GSP-NVS Δp CONTROL SEQUENCING

This signal shunts the b leg input mux of the z-unit adder to select the contents of left_z or span_z.

we_win
    This signal set the final winner output mux mux_win_z to select the contents of dlz2_z or the contents of dl2_z.

mux_left_z
    This signal selects the value of z-bus or span_z as the input to the left_z register.

carry_in_z
    This is not a control signal, but the ripple carry between stages.

cmp_carry_in_z
    This is not a control signal, but the ripple carry between stages.

There are 7 control lines, plus the carry signals, plus the clocks.

Control signals for the X unit:

load_left2_x
    This signal causes the contents of the x-bus to be latched into the left2_x register.

load_ct2
    This signal causes the contents of the x-bus to be latched into the ct2 register.

load_yinc2_x
    This signal causes the contents of the x-bus to be latched into the yinc2_x register.

load_yinc_lx
    This signal causes the value of yinc2_x to be latched into the yinc_lx register.

load_yinc_rx
    This signal causes the value of yinc2_x to be latched into the yinc_rx register.

mux_uax
    These signals control the inputs to the registers for the upper (a) alu leg, selecting from the output of: left2_x or ct2 or span_x.

load_left_x
    This signal causes the output of mux_uax to be latched into the left_x register.

load_right_x
    This signal causes the output of mux_uax to be latched into the right_x register.

load_ct_fin
    This signal causes the output of mux_uax to be latched into the ct_fin register.

mux_alua_x
    These signals shunts the a leg input mux of the x-unit adder to select the contents of left_x or right_x or ct_fin.

mux_alub_x
    These signals shunts the b leg input mux of the x-unit adder to select the contents of yinc_lx or yinc_rx or x-bus.

carry_in_x
    This is not a control signal, but the ripple carry between stages.

What is claimed is:

1. An image processing system comprising:
a plurality of polygon processors coupled in series, each polygon process including
means for storing a representation of a single polygon, said polygon representing a portion of a three-dimensional object;
means for comparing said representation to an input representation of a pixel to determine whether said pixel is within said polygon;
means for comparing a Z position of said pixel to a Z position of said polygon; and
means for providing to an output of said polygon processor, which is coupled to an input of a next polygon processor in said series, except for a last polygon processor, a material property and Z position of said pixel in said polygon if said polygon has a Z position for said pixel in front of a received z position associated with said pixel.

2. The polygon processor of claim 1 wherein said polygons are triangles.

3. The triangle processor of claim 2 wherein each said triangle is represented by data comprising:
X, Y coordinates of each vertex of said triangle;
a Z coordinate for each of said vertices; and
a material property for said triangle.

4. The polygon processor of claim 1 further comprising means for inputting a representation of a new polygon initially and after pixels corresponding to all positions of said first-mentioned polygon have been compared to said first polygon.

5. The polygon processor of Claim 1 wherein an output of said means for comparing a Z position is used only if said pixel is within said polygon.

6. A pipeline as set forth in claim 6 wherein said polygons are triangles and further comprising:
a second pipeline of triangle processors coupled in parallel with said first-mentioned pipeline;
means for loading said pipelines with triangle descriptions;
means for alternating providing pixel processing instructions to alternate ones of said triangle processor pipelines; and
means, coupled to an output of each said triangle processor pipelines, for multiplexing signals from said outputs of said triangle processor pipelines.

7. The apparatus of claim 6 further comprising at least one first-in, first-out buffer coupled to an input of one of said pipelines, for temporarily storing triangle descriptions.

8. The polygon processor pipeline of claim 6 further comprising:
a second pipeline of polygon processors coupled in parallel with said first-mentioned pipeline;
means, in each polygon processor, for storing additional data representing a polygon; and
means for providing a first portion of additional data describing a single polygon to said first pipeline and a second portion of additional data describing said single polygon to said second pipeline.

9. The polygon processor of claim 1 further comprising means for interpolating a Z value for internal positions of said polygon.

10. The polygon processor of claim 9 wherein each said polygon is further represented by additional data and further comprising means for interpolating said additional data for interior positions of said polygon.

11. The polygon processor of claim 9 wherein said additional data comprises a normal vector representation for each of a plurality of vertices of said polygon and said means for interpolating additional data comprises means for interpolating a normal vector.

12. The polygon processor of claim 9 wherein said additional data comprises a texture index value into a multidimensional color and/or perturbed normal texture table.

13. The polygon processor of claim 9 wherein said additional data comprises red, green and blue (RGB) color components.

14. The polygon processor of claim 1 wherein each position in said polygon is represented according to the same coordinate map used for said pixel so that said z positions for all polygons covering a given pixel position correspond to the same point location.

15. A semiconductor chip comprising a plurality of polygon processors as set forth in claim 1 coupled in series, each of said polygon processors further comprising enable logic addressably setable for that polygon processor, said enable logic having a first state for disabling said polygon processor from storing a representation of a polygon so that said polygon processor passes said representation of a polygon unaltered to a next polygon processor.

16. A semiconductor chip comprising a plurality of polygon processors as set forth in claim 1 coupled in series and further comprising:
counting means for providing an X position of a plurality of pixels to each of said polygon processors;
input buffer means for coupling a plurality of input pins to said X counter means and a first one of said polygon processors; and
output buffer means for coupling a last one of said polygon processors to a plurality of output pins.

17. The semiconductor chip of claim 16 wherein said input buffer includes multiplexing means for coupling said input pins to a larger number of input lines to said first triangle processor and said X counter means, and said output buffer means includes multiplexing means for coupling a plurality of output lines from said triangle processor to a smaller number of said output pins.

18. The semiconductor chip of claim 16 wherein said input buffer means further comprises means for delaying a first segment of multiplexed data until the arrival of a second set of multiplexed data, and said buffer means includes means for delaying a second segment of data until after a first segment of data is provided to said output pins.

19. The semiconductor chip of claim 16 further comprising means for delaying a plurality of data bits until a plurality of command bits are decoded 20. A semiconductor chip comprising:
a plurality of polygon processors coupled in series, each polygon processor including
means for storing a representation of a polygon, said polygon representing a portion of a three-dimensional object,
means for comparing said representation to a pixel to determine whether said pixel is within said polygon,
means for comparing a Z position of said pixel to a Z position of said polygon, and
means for providing to an output a material property and Z position of said pixel in said polygon if said polygon has a Z position for said pixel in front of a Z position associated with said pixel;
counting means for providing an X position of a plurality of pixels to each of said polygon processors;
input buffer means for coupling a plurality of input pins to said X counter means and a first one of said polygon processors; and
output buffer means for coupling a last one of said polygon processors to a plurality of output pins.

21. The semiconductor chip of claim 20 further comprising:
a plurality of said polygon processors coupled in series to form a first pipeline;
a plurality of said polygon processors coupled in series to form a second pipeline of polygon processors coupled in parallel with said first pipeline;
means for loading one of said pipelines with polygon descriptions while the other of said pipelines is processing pixels;
means for alternating providing pixel processing instructions to alternate ones of said polygon processor pipelines; and
means, coupled to an output of each said polygon processor pipelines, for multiplexing signals from said outputs of said polygon processor pipelines.

22. An image processing system comprising:
a plurality of triangle processors, each triangle processor being a special purpose processor including;
X unit means for comparing a representation of a triangle to a pixel to determine whether said pixel is within said triangle;
Z unit means for comparing a Z position of said pixel to a Z position of said triangle;
material unit means for storing a material property of said triangle; and
control unit means for providing said material property to an output along with the Z position in said triangle if said triangle has a Z position for said pixel in front of a Z position associated with said pixel.

23. The triangle processor of claim 22 further comprising N-unit means for storing a normal vector for a plurality of positions of said triangle and for interpolating said normal vector in X, Y and Z directions for a plurality of pixel positions within said triangle.

24. The triangle processor of claim 23 wherein said control unit means further comprises:
means for loading a new triangle representation into said triangle processor; and
means for determining when all pixels contained within said triangle have been processed.

25. The triangle processor of claim 24 wherein;
said X unit means includes a plurality of registers for storing data indicating the boundaries of a triangle;
said Z unit means includes a first register for storing an initial value of Z and at least a second register for storing an incremental value of Z;
said N unit means includes NX, NY and NZ unit means for determining the X, Y and Z components of a normal vector, respectively, each of said NX, NY and NZ unit means containing at least one register for storing an initial value of NX, NY and NZ, respectively, and at least one additional register for storing an incremental value of NX, NY and NZ, respectively.

* * * * *